(12) United States Patent
Kawai

(10) Patent No.: US 7,583,414 B2
(45) Date of Patent: Sep. 1, 2009

(54) IMAGE INPUT SYSTEM

(75) Inventor: Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 11/468,602

(22) Filed: Aug. 30, 2006

(65) Prior Publication Data

US 2007/0097460 A1    May 3, 2007

Related U.S. Application Data

(60) Division of application No. 10/865,729, filed on Jun. 10, 2004, now Pat. No. 7,321,453, which is a continuation of application No. 08/603,611, filed on Feb. 21, 1996, now Pat. No. 6,768,563.

(30) Foreign Application Priority Data

| Feb. 24, 1995 | (JP) | ................................. | 7-036931 |
| Apr. 10, 1995 | (JP) | ................................. | 7-083811 |
| Jul. 13, 1995 | (JP) | ................................. | 7-177005 |

(51) Int. Cl.
  H04N 1/40    (2006.01)
  H04N 1/387   (2006.01)
(52) U.S. Cl. ...................... 358/450; 358/444
(58) Field of Classification Search ................. 358/448, 358/443, 1.1, 474, 400, 401, 403, 500, 504, 358/505, 430, 439, 449, 453, 450, 452
See application file for complete search history.

(56) References Cited

U.S. PATENT DOCUMENTS

| 4,396,945 A | 8/1983 | DiMatteo et al. |
| 4,543,609 A | 9/1985 | Smith .......................... 358/210 |
| 4,760,463 A | 7/1988 | Nonoyama .................. 358/280 |
| 4,992,866 A | 2/1991 | Morgan ....................... 358/108 |
| 4,996,592 A | 2/1991 | Yoshida ....................... 358/85 |
| 5,363,169 A | 11/1994 | Ishida et al. ................. 354/442 |
| 5,555,104 A | 9/1996 | Todaka ........................ 358/468 |
| 5,611,032 A | 3/1997 | Matsuura et al. ............ 395/133 |
| 5,636,039 A | 6/1997 | Tanno et al. ................. 358/474 |

(Continued)

FOREIGN PATENT DOCUMENTS

DE    4 244 356 A1    1/1993

(Continued)

OTHER PUBLICATIONS

English Abstract of Japanese Application 06-181539.

(Continued)

*Primary Examiner*—Jerome Grant, II
(74) *Attorney, Agent, or Firm*—Cowan, Liebowitz & Latman, P.C.

(57) ABSTRACT

This invention provides an image input system capable of setting an arbitrary imaging inhibited area. This system displays a map showing the positions of cameras arranged in an office and the directions in which these cameras can be aimed, or displays the view angles of the cameras. An operator designates an imaging inhibited area on the map. In accordance with the designated imaging inhibited area, a limiting direction is calculated for each camera, and each camera is so controlled as not to point in that direction. Even when cameras are fixed, the system controls display so that an imaging inhibited area is not displayed.

10 Claims, 36 Drawing Sheets

U.S. PATENT DOCUMENTS

| | | | |
|---|---|---|---|
| 5,746,806 A * | 5/1998 | Aylsworth et al. | 95/8 |
| 5,802,494 A | 9/1998 | Kuno | 705/2 |
| 5,808,670 A | 9/1998 | Oyashiki et al. | |
| 5,838,368 A | 11/1998 | Masunaga | 348/211 |
| 5,845,076 A * | 12/1998 | Arakawa | 709/203 |
| 6,195,176 B1 | 2/2001 | Tanno et al. | 358/400 |
| 6,208,376 B1 | 3/2001 | Tanaka | 348/153 |
| 6,208,379 B1 | 3/2001 | Oya | 348/213 |
| 6,266,082 B1 | 7/2001 | Yonezawa et al. | 348/159 |
| 6,266,085 B1 | 7/2001 | Kato et al. | |
| 6,400,401 B1 | 6/2002 | Morino et al. | |
| 6,442,327 B1 * | 8/2002 | Yamada et al. | 386/46 |
| 6,476,923 B1 * | 11/2002 | Cornell | 358/1.12 |
| 6,680,746 B2 | 1/2004 | Kawai et al. | |
| 6,768,563 B1 | 7/2004 | Murata et al. | |
| 2001/0019360 A1 | 9/2001 | Tanaka | 348/211 |
| 2001/0023201 A1 | 9/2001 | Takatsuka | 463/31 |
| 2001/0024233 A1 | 9/2001 | Urisaka | 348/213 |
| 2001/0026318 A1 | 10/2001 | Yonezawa | 348/159 |
| 2002/0018123 A1 | 2/2002 | Suzuki | 348/211 |
| 2002/0051080 A1 | 5/2002 | Tanaka | 348/552 |
| 2002/0067412 A1 | 6/2002 | Kawai | 348/211 |
| 2002/0097322 A1 | 7/2002 | Monroe | 348/159 |
| 2002/0142800 A1 | 10/2002 | Iimura | 455/556 |

FOREIGN PATENT DOCUMENTS

| | | |
|---|---|---|
| EP | 0513601 A1 | 11/1992 |
| EP | 0 539 695 A2 | 5/1993 |
| EP | 0 644 694 A1 | 3/1995 |
| EP | 0 729 275 | 8/1996 |
| EP | 0 637 168 B1 | 4/1999 |
| JP | 62-057371 | 3/1987 |
| JP | 63-306946 | 12/1988 |
| JP | 04-076698 | 3/1992 |
| JP | 04-317288 | 11/1992 |
| JP | 04-373386 | 12/1992 |
| JP | 05-075995 | 3/1993 |
| JP | 05-289796 | 11/1993 |
| JP | 06-030408 | 2/1994 |
| JP | 06-105311 | 4/1994 |
| JP | 06-181539 | 6/1994 |
| JP | 06-259178 | 9/1994 |
| JP | 06-348327 | 12/1994 |
| JP | 06-350894 | 12/1994 |
| JP | 07-046566 | 2/1995 |
| JP | 410126670 A | 5/1998 |
| JP | 10 178581 A | 6/1998 |
| JP | 02001224012 | 8/2001 |

OTHER PUBLICATIONS

English Abstract of Japanese Application 04-317288.
English Abstract of Japanese Application 06-350894.
English Abstract of Japanese Application 62-057371.
English Abstract of Japanese Application 05-289796.
English Abstract of Japanese Application 06-105311.
English Abstract of Japanese Application 04-373386.
PTO-892, U.S. Appl. No. 10/865,729, filed Jun. 10, 2004.

* cited by examiner

FIG. 9

| CAMERA No. | CAMERA NAME | HOST NAME | INSTALLATION POSITION | INITIAL DIRECTION | PAN ENABLE DIRECTION (a,A) | CURRENT DIRECTION (N) |
|---|---|---|---|---|---|---|
| 1 | camera1 | host1 | (150, 11) | 180 | (140, 220) | 200 |
| 2 | camera2 | host1 | (33, 280) | 40 | (10, 70) | 40 |
| ----- | ----- | ----- | ----- | ----- | ----- | ----- |

901

CASE 1 (A > a > D > d)

CASE 1 (a < A < d < D)

CASE 2 (d < a < D < A)

CASE 3 (a < d < D < A)

CASE 4 (a < d < A < D)

CASE 5 (d < a < A < D)

FIG. 16

| CAMERA | ACCESS PERMITTED HOST NAMES |
|---|---|
| camera1 | host1,host3,host5 |
| camera2 | host1,host2,host3 |
| camera3 | host1 |
| camera4 | |
| camera5 | host5,host1,host7,host8 |
| ⋮ | ⋮ |

FIG. 18

| IMAGING INHIBITED AREA | OBJECTIVE CAMERAS |
|---|---|
| 1 | camera1,camera2,camera3,camera5 |
| 2 | camera2 |
| 3 | camera3,camera8,camera9,camera10 |
| 4 | camera1,camera2,camera4 |
| 5 | camera4,camera5,camera6 |
| ⋮ | ⋮ |

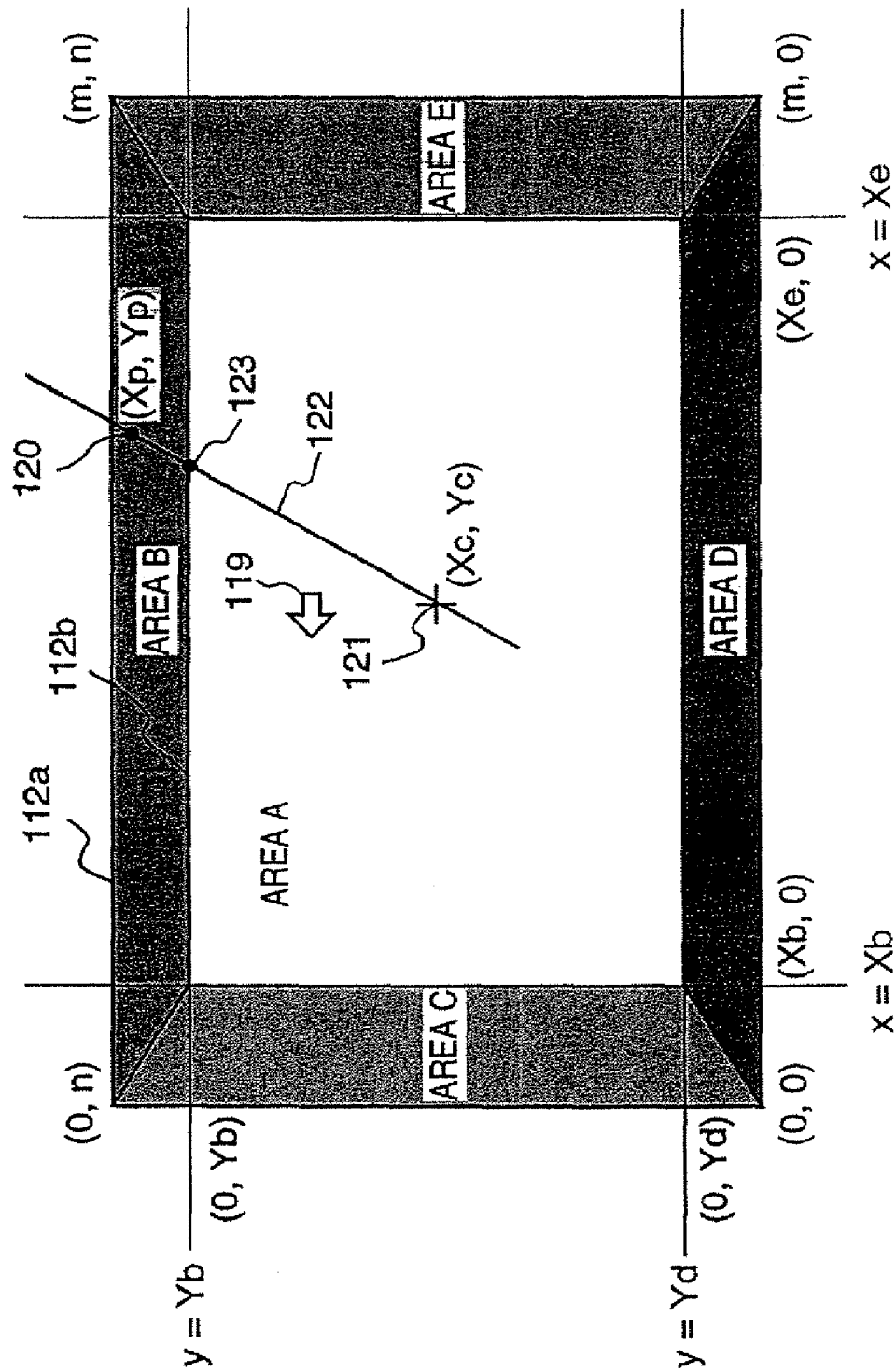

DISPLAY SCREEN

FIG. 36

| VIRTUAL CAMERA No. | θ, φ | ZOOM | OPERATION PANEL ID |
|---|---|---|---|
| 1 | 10, 30 | 1.0 | 1001 |
| 2 | 20, 40 | 2.0 | 2001 |
| ⋮ | ⋮ | ⋮ | ⋮ |
| N | 0, 0 | 1.0 | N001 |

IMAGE INPUT SYSTEM

This application is a divisional of application Ser. No. 10/865,729, filed Jun. 10, 2004, now U.S. Pat. No. 7,321,453, which is a continuation of Ser. No. 08/603,611, filed Feb. 21, 1996 now U.S. Pat. No. 6,768,563, which priority under 35 U.S.C. §120 is claimed and which are hereby incorporated by reference herein in their entirety as if fully set forth herein.

BACKGROUND OF THE INVENTION

The present invention relates to a camera control system and, more particularly, to a camera control system in which at least one operator remotely operates at least one camera.

A video transmission system has been proposed in which large numbers of cameras and computers are arranged in a building and connected in a network to enable transmission of images or conversations using images and voices between two (or three or more) arbitrary points. For example, this system is expected to be used as a video conference system or a remote monitoring system. For these purposes, cameras whose direction and zooming can be externally controlled are already commercially available. In such a video transmission system each operator can remotely operate a given camera from a given place and/or display an image taken by a given camera on the screen of his or her computer.

In a video transmission system in which remote control of a given camera is possible, as the number of cameras to be operated increases it is more and more necessary to allow each operator to readily know the location of each camera. The present applicant has already proposed a system in which camera symbols indicating individual cameras are superposed on a map image which shows the installation sites of these cameras. The present applicant has also proposed a system in which the direction of each camera is indicated by the direction of a corresponding camera symbol.

The following problem arises when further improvements of a camera control system of this sort are attempted. That is, any user using the system can freely remotely operate cameras connected to other hosts and see images taken by these cameras. However, persons in the sensing enable ranges of the cameras to be remotely operated feel as if they were being monitored, and this may give them a strong unpleasant feeling. That is, under this condition the privacy of each person in the imaging range of a camera is invaded.

SUMMARY OF THE INVENTION

It is an object of the present invention to solve the above conventional problem and provide a camera control system in which the protection of privacy is taken into consideration.

That is, it is an object of the present invention to provide a camera control system in which a range within which imaging is not permitted, i.e., an imaging inhibited range, can be set for each camera, and an image in this imaging inhibited range cannot be physically or essentially taken by a remote operation.

It is another object of the present invention to provide a camera control system in which each operator can easily recognize the imaging inhibited range of each camera which he or she intends to remotely operate.

It is still another object of the present invention to provide a camera control system which can rapidly set the imaging direction or the magnification of an image.

To achieve the above objects, a camera control system of the present invention has the following arrangements.

An image input system comprising:
image pick-up means for picking-up an image in a predetermined area;
setting means for setting an imaging inhibited area in which imaging is inhibited in the predetermined area;
input means for inputting an image of a desired area excluding the imaging inhibited area set by the setting means from the predetermined area picked-up by the pick-up means; and
display means for displaying the input image from the input means.

An image input system for displaying an input image, comprising:
at least one camera for picking-up an image of an object;
camera moving means for moving the camera by one or both of panning and tilting;
map display means for displaying a map showing a position of the camera and a direction in which the camera can be aimed by the camera moving means;
setting means for setting an imaging inhibited area in which image-picking-up is inhibited on the map displayed by the map display means; and
display means for displaying an image picked-up by a desired at least one of the at least one camera.

An image input system for displaying an input image, comprising:
at least one camera for picking-up an image of an object;
camera moving means for moving the camera within a predetermined range by one or both of panning and tilting;
direction designating means for designating a direction of a desired camera of the at least one camera;
message display means for displaying a message indicating that the camera cannot be moved, when the direction designated by the direction designating means falls outside the predetermined range; and
image display means for displaying an image picked-up by the desired camera.

An image input system for displaying an input image, comprising:
at least one camera for picking-up an image of an object;
camera moving means for moving the camera within a predetermined range by one or both of panning and tilting;
direction designating means for designating a direction of a desired camera of the at least one camera;
control means for aiming the camera at a position closest to the direction designated by the direction designating means, when the direction designated by the direction designating means falls outside the predetermined range; and
image display means for displaying an image picked-up by the desired camera.

An image input system for displaying an input image, comprising:
at least one camera for picking-up an image of an object;
region designating means for designating a partial region having a desired size and a desired position from an input image picked up by a desired camera of the at least one camera; and
display means for displaying the partial region designated by the region designating means.

An image display method of displaying an image picked-up by image pick-up means, comprising:
a setting step of setting an imaging inhibited area in which imaging is inhibited in a predetermined area;
an input step of inputting an image of a desired area excluding the imaging inhibited area set by the setting step from the predetermined area picked-up by the pick-up means; and a display step of displaying the input image from the input step.

An image display method of displaying an image picked-up by at least one camera moved by one or both of panning and tilting by camera moving means, comprising:

a map display step of displaying a map showing a position of the camera and a direction in which the camera can be aimed by the camera moving means;

a setting step of setting an imaging inhibited area in which image picking-up is inhibited on the map displayed by the map display step; and a display step of displaying an image picked-up by a desired one of the at least one camera.

An image display method of displaying an image picked-up by at least one camera moved within a predetermined range by one or both of panning and tilting by camera moving means, comprising:

a direction designating step of designating a direction of a desired camera of the at least one camera;

a message display step of displaying a message indicating that the camera cannot be moved, when the direction designated by the direction designating step falls outside the predetermined range; and an image display step of displaying an image picked-up by the desired camera.

An image display method of displaying an image picked-up by at least one camera moved within a predetermined range by one or both of panning and tilting by camera moving means, comprising:

a direction designating step of designating a direction of a desired camera of the at least one camera;

a control step of aiming the camera at a position closest to the direction designated by the direction designating step, when the direction designated by the direction designating step falls outside the predetermined range; and an image display step of displaying an image taken by the desired camera.

An image display method of displaying an image picked-up by at least one camera, comprising:

the region designating step of designating a partial region having a desired size and a desired position from an input image taken by a desired camera of the at least one camera; and the display step of displaying the partial region designated by the region designating step.

A computer readable memory storing a program of displaying an image taken by image pick-up means, comprising:

codes of a process of setting an imaging inhibited area in which imaging is inhibited in a predetermined area;

codes of a process of inputting an image of a desired area excluding the imaging inhibited area set by the setting step from the predetermined area; and codes of the display step of displaying the input image from the input step.

A computer readable memory of the present invention has the following arrangements.

A computer readable memory storing a program of displaying an image taken by at least one camera moved by one or both of panning and tilting by camera moving means, comprising:

codes of a process of displaying a map showing a position of the camera and a direction in which the camera can be aimed by the camera moving means;

codes of a process of setting an imaging inhibited area in which imaging is inhibited on the map displayed by the map display step; and codes of a process of displaying an image taken by a desired one of the at least one camera.

A computer readable memory storing a program of displaying an image taken by at least one camera moved within a predetermined range by one or both of panning and tilting by camera moving means, comprising:

codes of a process of designating a direction of a desired camera of the at least one camera;

codes of a process of displaying a message indicating that the camera cannot be moved, when the direction designated by the direction designating step falls outside the predetermined range; and codes of a process of displaying an image taken by the desired camera.

A computer readable memory storing a program of displaying an image taken by at least one camera moved within a predetermined range by one or both of panning and tilting by camera moving means, comprising:

codes of a process of designating a direction of a desired camera of the at least one camera;

codes of a process of aiming the camera at a position closest to the direction designated by the direction designating step, when the direction designated by the direction designating step falls outside the predetermined range; and codes of a process of displaying an image taken by the desired camera.

The camera control system and method of the present invention with the above arrangements can designate an imaging inhibited area and thereby protect the privacy of a user. Additionally, since the imaging inhibited area can be set in a map window, the operation is easy and the imaging inhibited area can be clearly designated.

Also, even if a direction in which a camera is to be aimed is outside the movable range of the camera, the movement of the camera is restricted within the camera movable range. This prevents a damage to the camera.

Furthermore, an operator can set an imaging inhibited area and designate the direction of a camera while monitoring the view angle of the camera. This facilitates the operation.

The directions or the magnifications of a camera can be instantaneously switched.

Images such as are obtainable when a plurality of cameras are used can be obtained by using a single camera physically.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a view showing an example of a camera status table;

FIG. 16 is a view showing an example of a permitted host information file;

FIG. 18 is a view showing an example of a file for connecting set imaging inhibited areas and objective cameras;

FIG. 25 is a view for explaining the operation of the third embodiment;

FIG. 36 is a view showing a correspondence table of the extraction ranges and camera windows;

DETAILED DESCRIPTION OF THE PREFERRED EMBODIMENTS

Embodiments of the present invention will be described below with reference to the accompanying drawings.

First Embodiment

Figure 1:
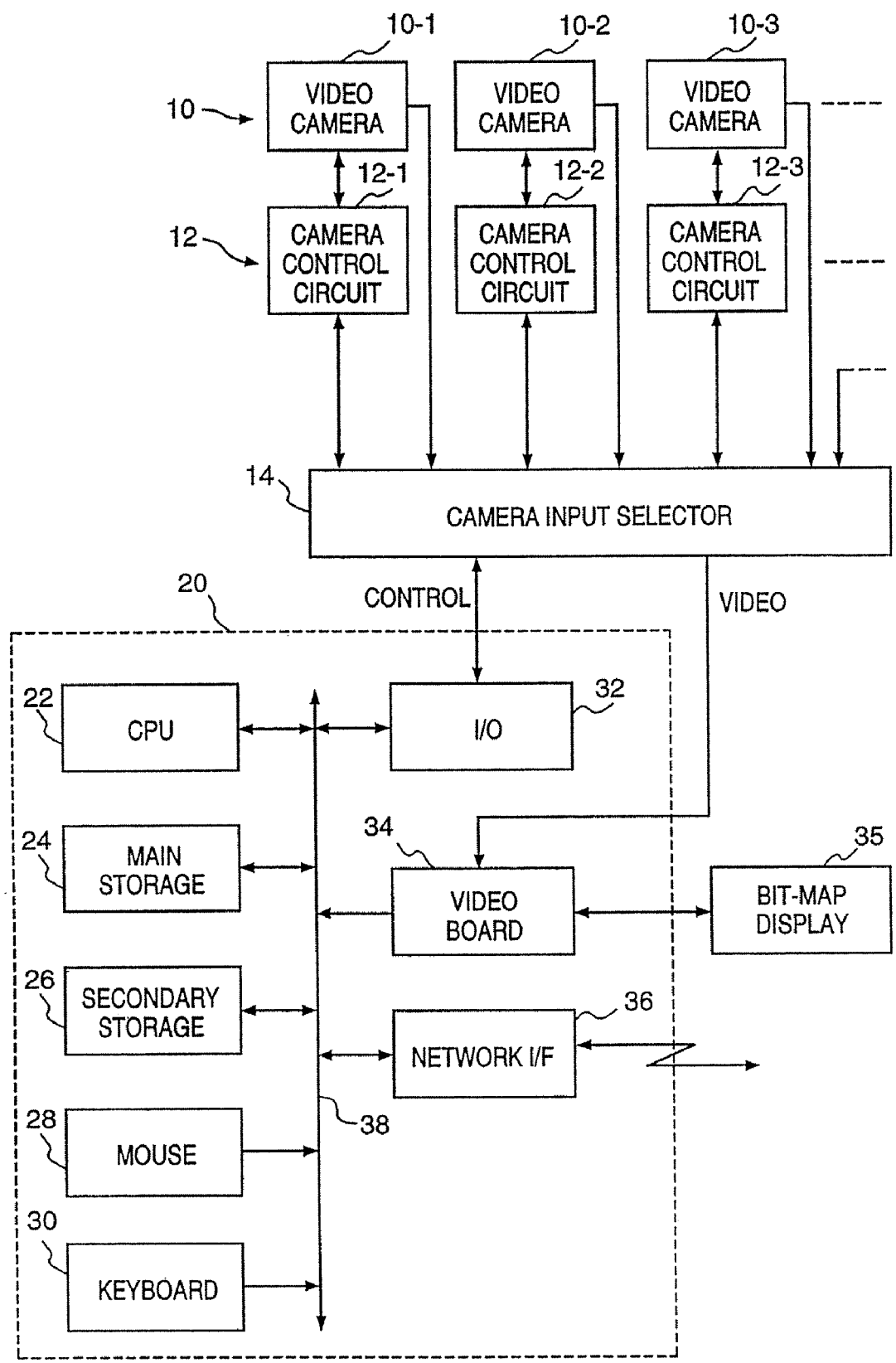
FIG. 1 is a schematic block diagram showing the basic configuration of a computer system according to one embodiment of the present invention.

FIG. 1 is a block diagram showing an outline of the configuration of a computer system in which a plurality of video communication terminals, i.e., cameras, which are basic elements in this embodiment of the present invention, are connected. One or more computers having the configuration shown in FIG. 1 and/or one or more computers having a similar configuration are interconnected with each other via a computer network.

In FIG. 1, camera control circuits 12 (12-1, 12-2, 12-3, . . . ) directly control, e.g., panning, tilting, zooming, focus adjustment, and aperture of video cameras 10 (10-1, 10-2, 10-3, . . . ) in accordance with external control signals. A camera input selector 14 selects a video camera 10 to be controlled and inputs an output signal from the camera. RS-232C is an example of a control signal line. However, the present invention is obviously not limited to this interface. Note that although an output signal is usually a video signal, a video signal and an audio signal are output if a camera with a microphone is used. In the following description it is assumed that only a video signal is output.

A video communication terminal 20 sends a control command to a desired camera control circuit 12 via the camera input selector 14 and controls a video camera 10 connected to the camera control circuit 12. Also, the video communication terminal 20 transmits an image picked-up by the selected camera to the network and receives images from the network. A CPU 22 controls the overall system by executing programs stored in a main storage 24 and a secondary storage (e.g., a hard disk drive) 26. A mouse 28 is a pointing device. The mouse 28 and a keyboard 30 are used by an operator as input devices.

An I/O port 32 connects the camera input selector 14 and supplies camera control commands to the camera input selector 14. A video board 34 inputs an output video signal from a video camera 10 selected by the camera input selector 14 and displays various images on a bit map display 35. A network interface 36 connects the video communication terminal 20 to a computer network or a communication network. A system bus 38 interconnects the devices from the CPU 22 to the network interface 36. Through the network interface 36 it is possible to send a camera control signal from a remote place to the video communication terminal 20 via the network and thereby control a given camera 10.

The camera input selector 14 selects one of the control signal lines and one of the video outputs connected to the camera control circuits 12. The camera input selector 14 supplies the selected video output to the video board 34 and logically connects the selected control signal line to the I/O port 32. An NTSC signal which is a luminance/color-difference separation type signal is an example of the video signal format. The video board 34 inputs the video output selected by the camera input selector 14. The input video signal is displayed as a dynamic image in a predetermined window of the bit map display 35 and/or transmitted to another terminal.

The secondary storage 26 stores various information, e.g., camera position information data and camera graphic data, pertaining to the cameras 10 and other cameras connected via the network. Details of these pieces of information will be described later.

If only one camera 10 is connected, the camera input selector 14 is unnecessary and one camera control circuit 12 is directly connected to the I/O port 32. Also, if no video signals are transmitted, the cameras 10, the camera control circuits 12, and the camera input selector 14 are unnecessary.

Figure 2:
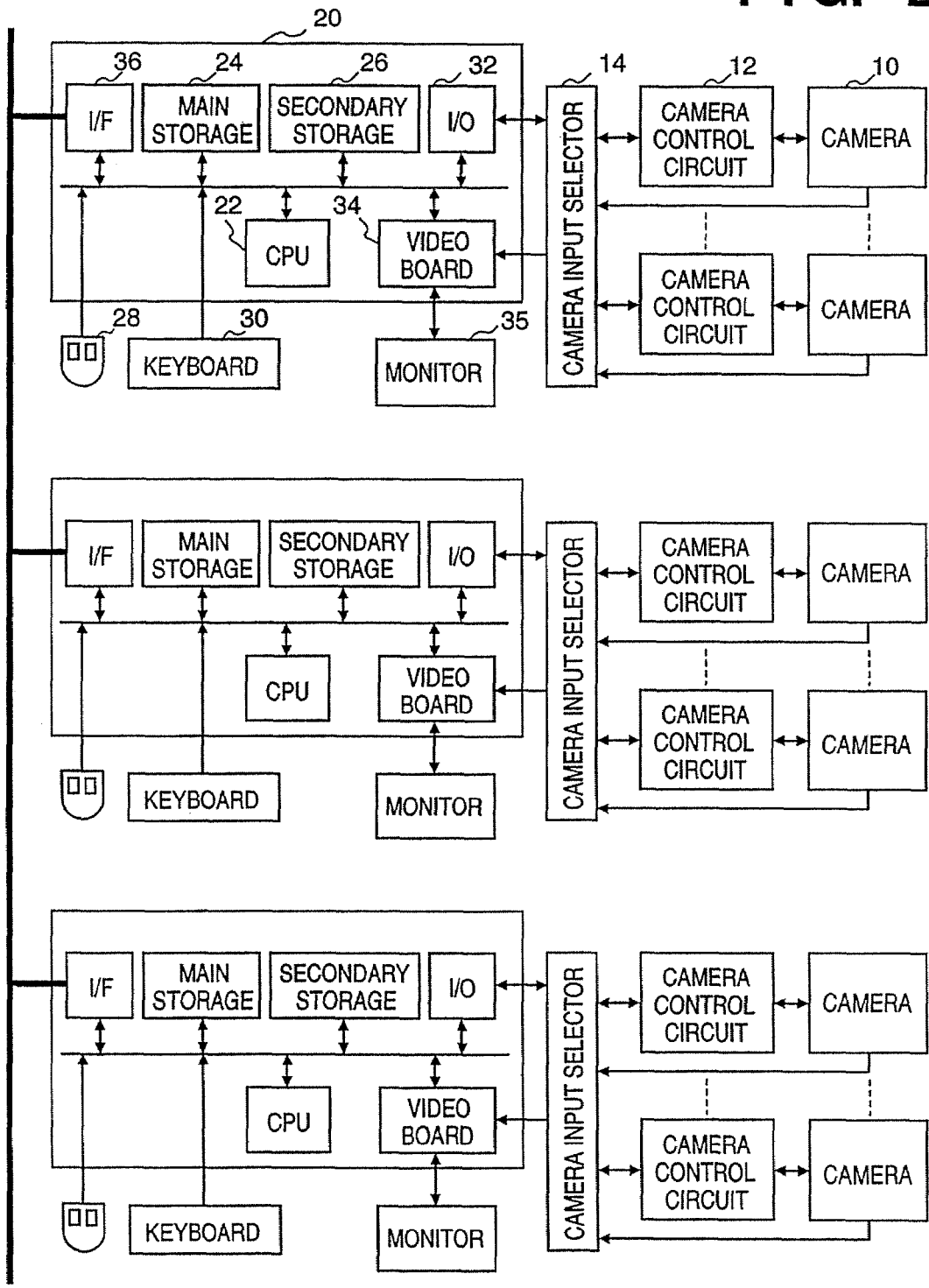
FIG. 2 is a schematic block diagram showing the hardware configuration of the embodiment in a network.

The apparatus shown in FIG. 1 is connected as a communication terminal to a network as illustrated in FIG. 2. Not all communication terminals need to have the configuration shown in FIG. 1. For example, the network can include a communication terminal to which only one camera is connected or a terminal to which no camera is connected (i.e., a terminal having a function of only remotely operating cameras connected to other terminals and displaying images from these cameras). Generally, communication terminals having such various configurations simultaneously exist in a single network. As the network used in this embodiment, a LAN or a WAN having an enough transmission band width to transmit digital dynamic image data and camera control signals is assumed. Dynamic image data is usually compressed before being transmitted. In this embodiment, however, a detailed description of the dynamic image compression method will be omitted since various existing methods are usable.

The video board 34 has the video capture function as described above. The video board 34 supplies input video data to the bit map display 35 to display images on it and also supplies the data to the CPU 22 through the bus 38. The CPU 22 packetizes the video data and outputs the packet to the network via the network interface 36. Packets of, e.g., a camera operation instruction and a camera switch instruction also are sent from the network interface 36 to the network. Additionally, packets of information pertaining to the overall system are sent to the network. These pieces of information are transmitted to either specified terminals or all terminals in accordance with the contents of data to be transmitted and with the necessity.

Reception is done in a similar fashion. That is, upon receiving packets of video data, a camera operation instruction, and a camera switch instruction, each video communication terminal 20 processes the received video data in the same manner as for internal capture data and processes the received camera operation and camera switch instructions in the same way as for analogous internal instructions. The information pertaining to the overall system is used to update system display of a user interface (to be described later).

Figure 3:
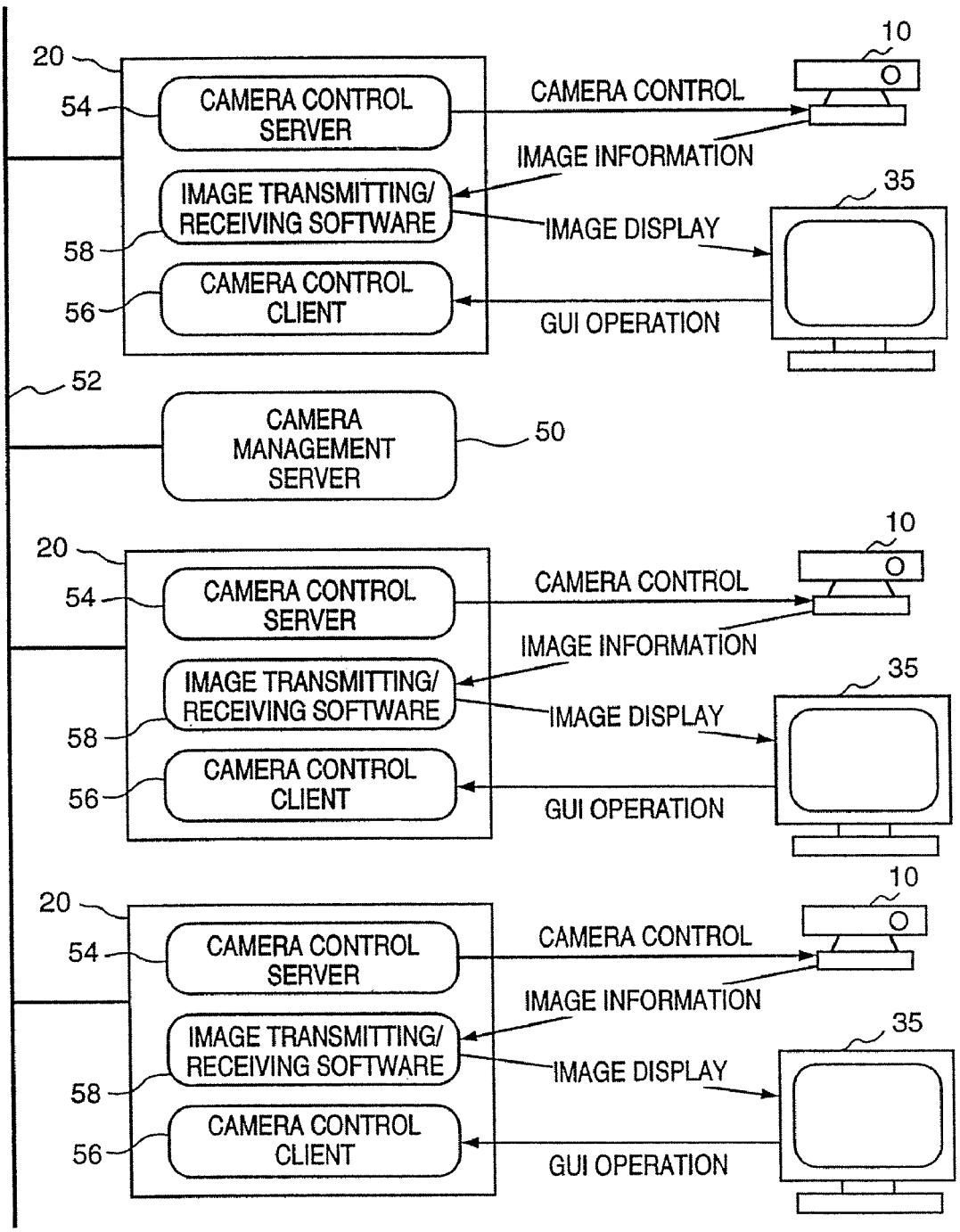
FIG. 3 is a schematic block diagram showing the software configuration of the embodiment in a network.

FIG. 3 is a block diagram showing the software configuration in the system of this embodiment. Referring to FIG. 3, the video communication terminals 20 and a camera management server 50 are connected to a computer network 52. A camera control server 54, a camera control client 56, and image transmitting/receiving software 58 are installed in each video communication terminal 20. The camera control server 54 controls the camera 10 in accordance with a camera control signal (including a select signal if a plurality of cameras are connected) entered from the self-terminal or transmitted from another terminal. The camera control client 56 remotely operates the camera 10 of the self-terminal or another terminal. The image transmitting/receiving software 58 supplies an image from the camera 10 of the self-terminal to other terminals via the network 52 and supplies images transferred from other terminals via the network 52 and an image from the camera 10 of the self-terminal to the display 35 of the self-terminal.

The camera management server 50 is software for managing all cameras 10 available (or connected) to the network 52 and holds information such as the camera name, host name, installation position, and current status of each camera. The camera management server 50 also manages registration of a camera which is newly made usable via the network 52 and delete of a camera disconnected from the network 52. Additionally, the camera management server 50 periodically informs all camera control clients 56 of the management information of all cameras. The camera management server 50 need only be stored in one of the terminals connected to the network 52.

The camera control client 56 displays the locations and directions of the camera 10 of the self-terminal and all cameras usable via the network 52 on the screen of the display 35 of the self-terminal by superposing predetermined camera symbols on a map. The camera control client 56 also updates the display state of each camera symbol in real time on the basis of the camera information periodically sent from the camera management server 50.

The camera control server 54, the camera control client 56, the camera image transmitting/receiving software 58, and the camera management server 50 are realized when the CPU 22 executes respective predetermined programs.

Figure 4:
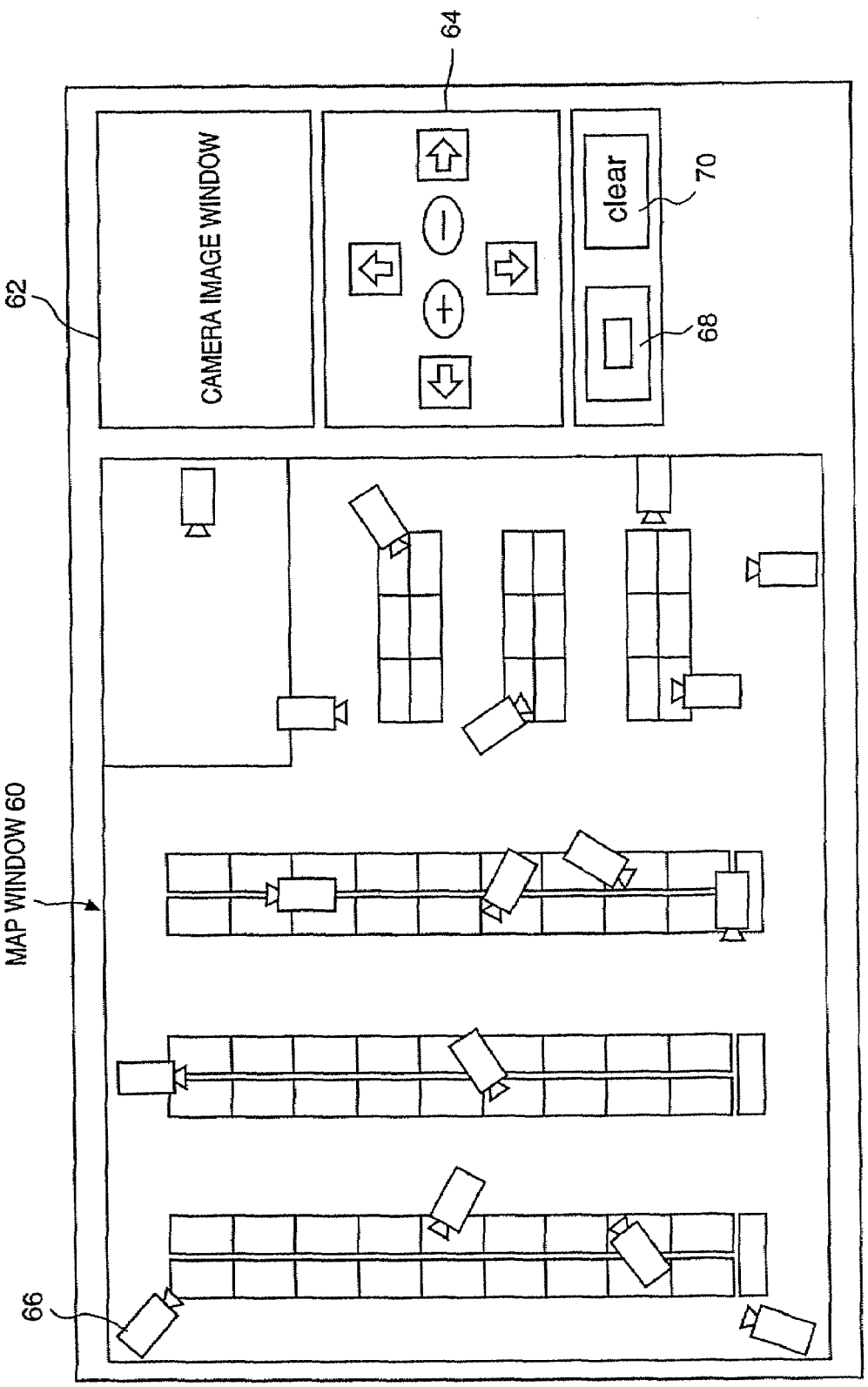
FIG. 4 is a view showing an example of a camera display control panel displayed on a display 35 by a camera control client 56.

FIG. 4 shows an example of a camera display control panel displayed on the display 35 by the camera control client 56. On a map showing the installation locations of operable cameras, a map window 60 superposes camera icons indicating the locations and directions of these cameras. A camera image window 62 displays an image from one selected camera. A camera operation panel 64 includes various camera control buttons and controls panning, tilting, and zooming of a selected camera. In this embodiment, it is assumed that a window display system capable of simultaneously displaying a plurality of windows is operating.

The map window 60 displays a map showing, e.g., the arrangement of seats in an office. On this map camera icons 66 indicative of the locations of individual cameras arranged in the office are superposed. Each camera icon 66 is displayed in the same position as the location of the corresponding camera and points in almost the same direction as the current camera direction. These camera icons 66 are displayed in different colors to distinguish between a camera which is currently selected to display an image or to be remotely operated, cameras used by other users, and cameras not used by anybody.

The operation panel 64 is displayed below the camera image window 62. The operation panel 64 includes rotation operating buttons for panning and tilting and two buttons for a zoom operation. By operating these buttons, a user can operate rotation (panning and tilting) and zooming of a given designated camera. If an operation of a selected camera is impossible (e.g., if the camera is already being operated by some other user), the rotation operating buttons and the zoom operating buttons are displayed in an operation disable state.

For instance, when a certain user desires an access to (in this case a remote operation of) a certain camera, the user double-clicks the camera icon indicating the camera of interest. In accordance with this double-click, the camera control client 56 requests the camera management server 50 to issue the access right to that camera. If there is no user currently operating that camera, the camera management server 50 grants a permission to perform a remote operation (including display of an image) of the camera. If there is a user operating the camera, the camera management server 50 denies the access right. If the access right is granted, an output image from the camera is displayed in the camera image window 62 and operations (panning, tilting, and zooming) from the camera operation panel 64 are enabled.

Below the operation panel 64, a set button 68 for setting an imaging inhibited area and a clear button 70 for canceling the set imaging inhibited area are displayed. In this embodiment, sensing a scene of an imaging inhibited area by the cameras is inhibited. The imaging inhibited area can be set in a camera control system which remotely operates a desired camera within an entire range in which the camera is operable. The imaging inhibited area is set for designated cameras or all cameras under the camera control system. A camera for which an imaging inhibited area is set cannot be remotely operated via the network to point in a direction in which the imaging inhibited area is sensed.

The processing of setting an imaging inhibited area in this embodiment will be described in detail below.

Figure 5:
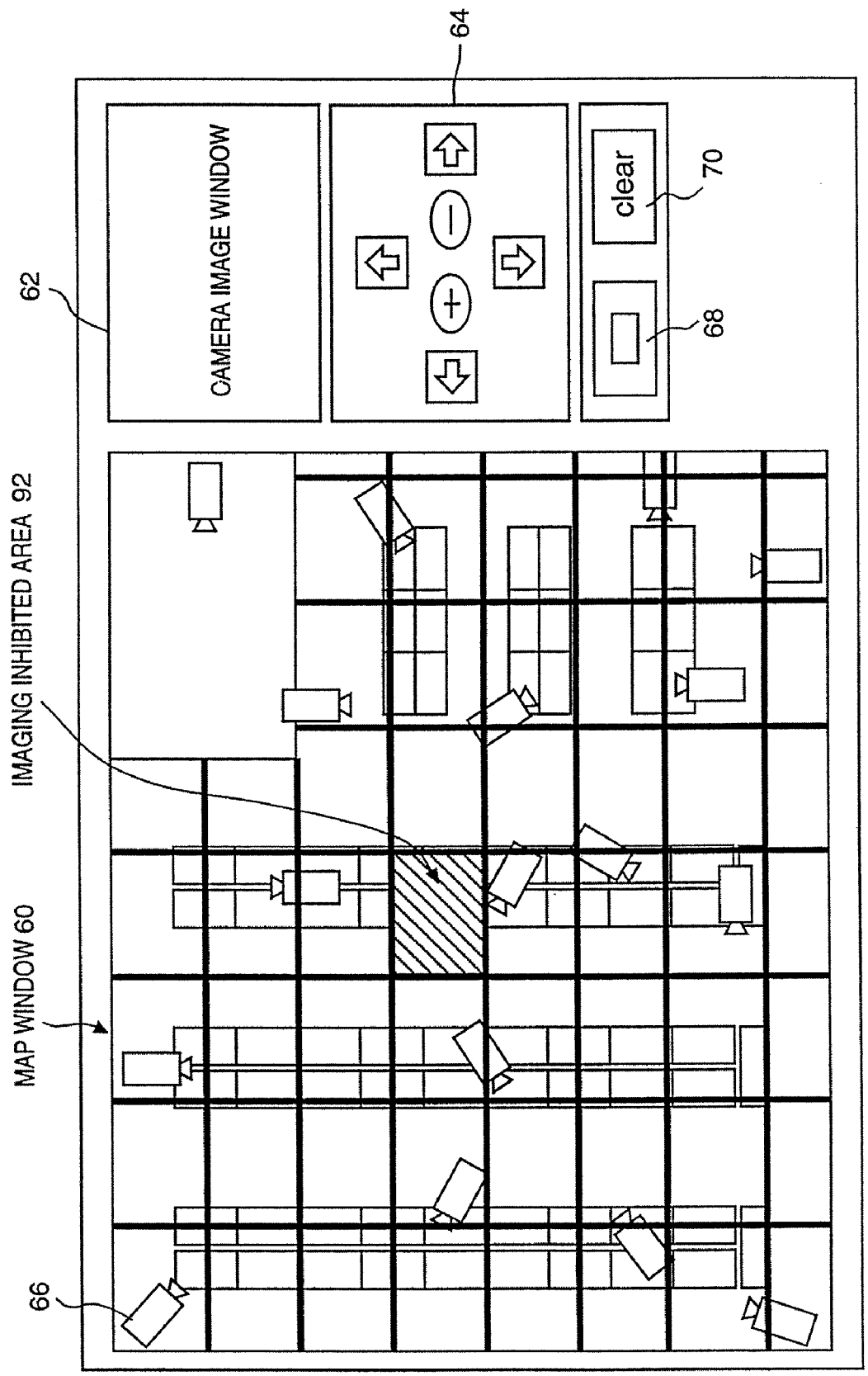
FIG. 5 is a view for explaining setting of an imaging inhibited area.

When a user clicks the imaging inhibited area set button 68, the camera control client 56 draws vertical and horizontal lines partitioning the map window 60 into a mesh as illustrated in FIG. 5. Areas divided by these vertical and horizontal lines are set units of an imaging inhibited area. On the map window 60, the user designates one or more divided areas in which he or she wants to inhibit sensing. The designated divided area (e.g., an area 92 in FIG. 5) is enclosed by, e.g., red so as to stand out clearly from other divided areas. When a desired divided area is selected as an imaging inhibited area, the user double-clicks the mouse button on the selected divided area. Consequently, an imaging inhibited area is set. To cancel the imaging inhibited area, it is only necessary to click the clear button 70 by using the mouse.

When the imaging inhibited area is set or changed, this information is supplied to the camera management server 50. The camera management server 50 changes the direction of a camera whose sensing range (field of view) includes the set or changed imaging inhibited area so that the imaging inhibited area is not sensed. Also, the direction of the corresponding camera icon 66 is similarly changed on the map window 60. That is, the camera control client 56 operating in the communication terminal 20 in which the imaging inhibited area is set informs the camera management server 50 that the imaging inhibited area is set, and sends coordinate information of the set imaging inhibited area to the server 50.

Figure 6A:
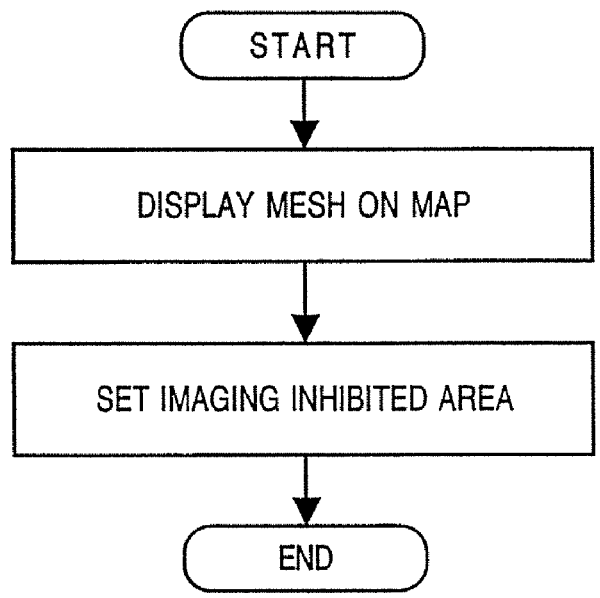
FIG. 6A is a flow chart showing processing of setting an imaging inhibited area.

FIG. 6A is a flow chart of the processing of the camera control client when an imaging inhibited area is set. This setting is done as described above.

Figure 6B:
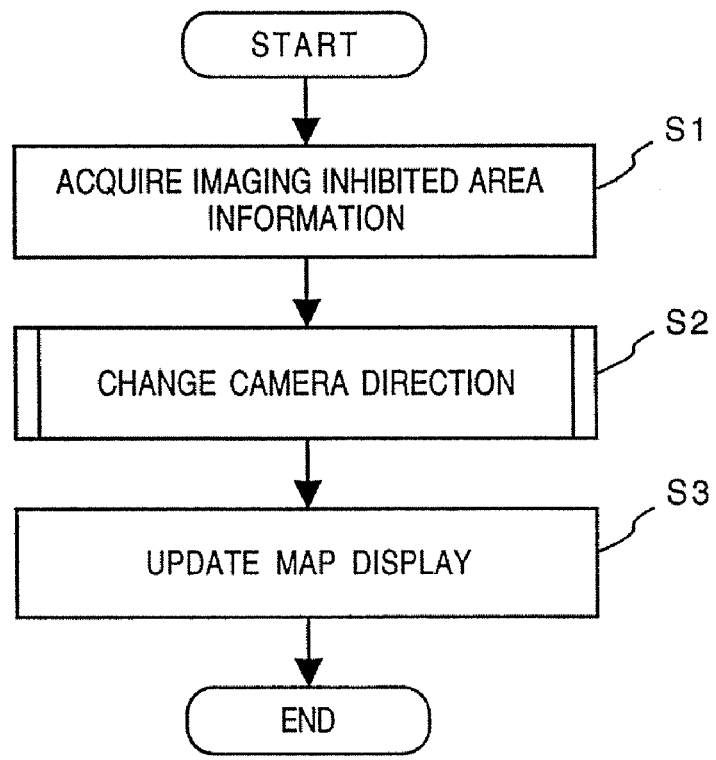
FIG. 6B is a flow chart showing the basic operation of a camera management server 50 with respect to the setting of an imaging inhibited area.

FIG. 6B is a basic flow chart of the camera management server 50 with respect to the setting and change of an imaging inhibited area. The camera management server 50 acquires coordinate information (coordinates of opposite corners of a rectangle) of the set imaging inhibited area (step S1). The camera management server 50 searches for a camera whose current sensing range includes even a portion of the set imaging inhibited area. The camera management server 50 issues to the corresponding camera a camera control command for changing the direction of the camera to a direction in which the imaging inhibited area moves out of the sensing range, thereby changing the imaging direction of the camera (step S2). Also, the camera management server 50 informs all camera control clients 56 of the changed direction of the camera whose direction is thus changed, and updates the direction of the corresponding camera icon 66 on the map window 60 (step S3).

Figure 7:
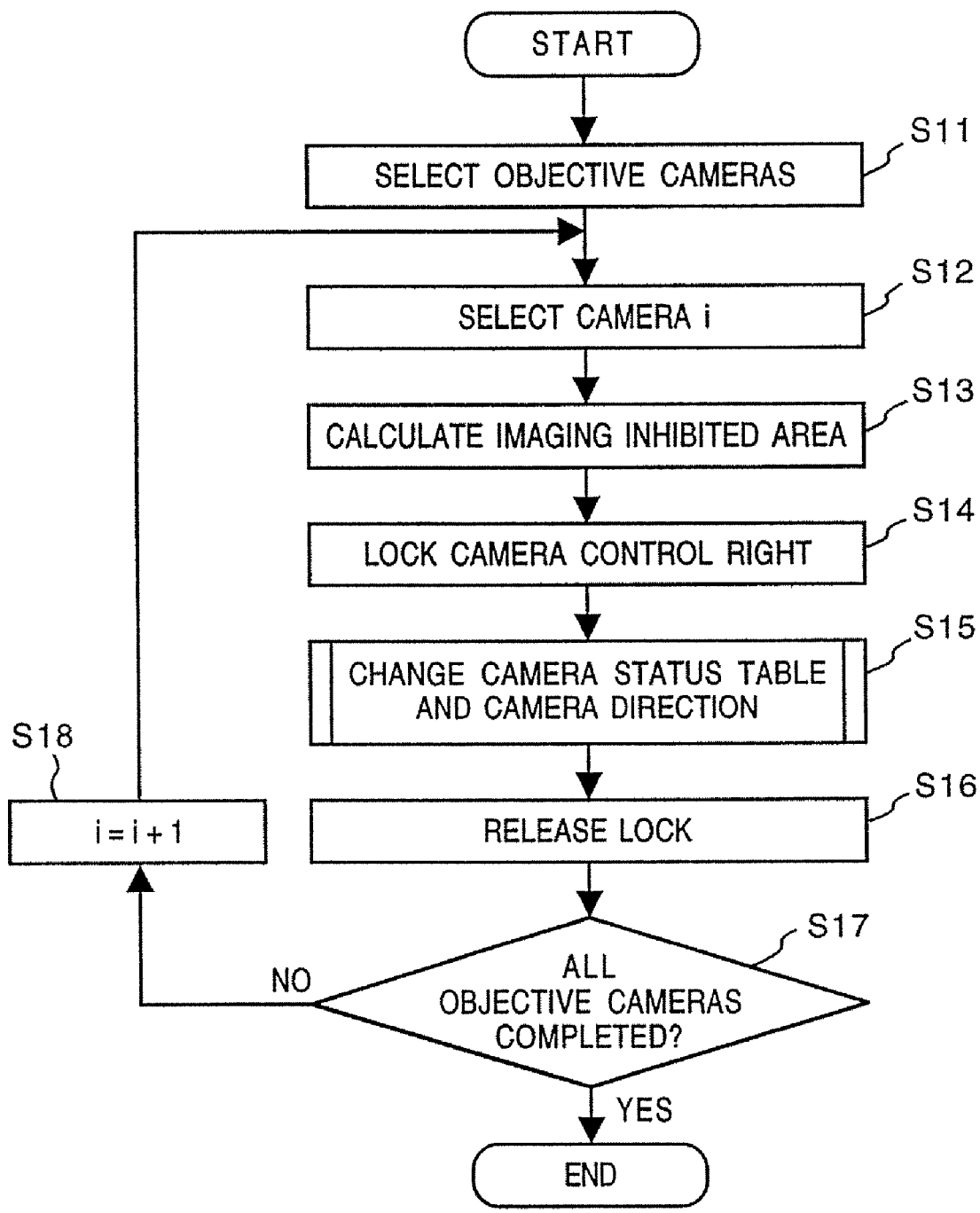
FIG. 7 is a detailed flow chart of step S2 in FIG. 6B.

FIG. 7 shows a detailed flow chart of step S2 in FIG. 6B. First, a camera whose direction is to be changed and a camera whose rotatable angle is to be changed are selected (step S11). Assume that cameras in a self-station locally connected to a host in which the imaging inhibited area is set are objective cameras. The camera management server selects these cameras by referring to host information of each camera.

Figure 8:
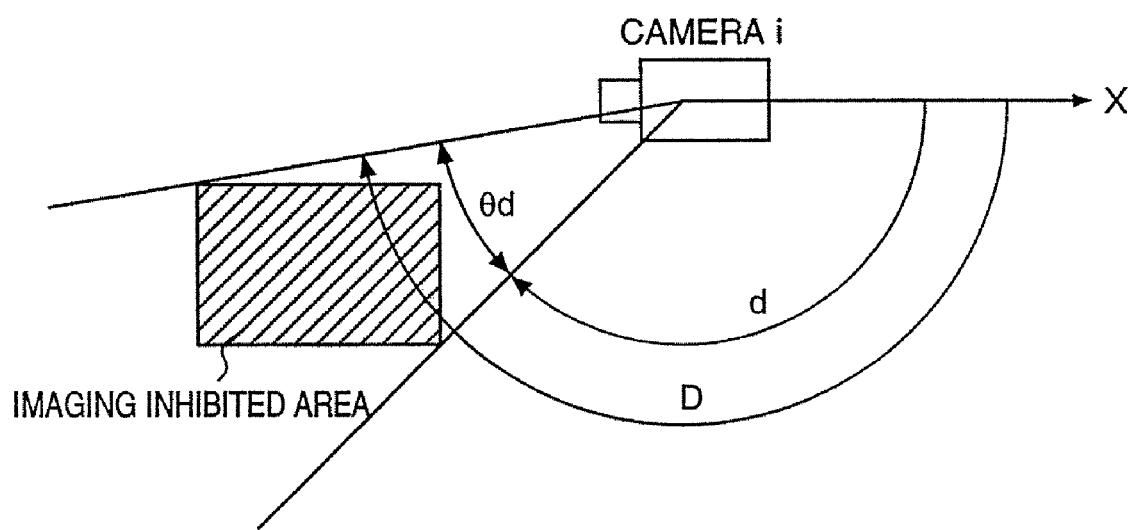
FIG. 8 is a schematic view showing the correspondence between an imaging inhibited area and an imaging inhibited direction.

The direction and the rotatable angle of each selected camera are changed. That is, of the cameras selected in step S11, a camera i of interest (whose zoom lens is set to the telephoto side) is selected in step S12. From the coordinates of the installation position of the camera i and the coordinates of the imaging inhibited area, an imaging inhibited angle θd (d<θd<D) in case that the optical system of the camera i is set to the widest angle is calculated as illustrated in FIG. 8 (step S13). Angles d and D are centered around the camera i at the two ends of the imaging inhibited area on the map plane. Camera control of the camera i is temporarily locked so that no user operates the camera i before the camera i is completely updated (step S14). From a camera status table (to be described later) and the imaging inhibited angle calculated in step S13, the pan enable angle of the camera i is changed so that the camera i does not aim in the imaging inhibited direction. If the camera i is currently pointing in the imaging inhibited direction, a camera control command which changes the direction of the camera so that the camera moves out of the imaging inhibited angle is transmitted to a corresponding camera control server 54 (step S15). Details of this change processing will be described later. When the necessary change processing is completed, camera control lock of the camera i is released (step S16).

The processing from step S13 to step S15 is executed for all of the cameras selected in step S11 by changing the camera of interest in steps S17 and S18.

FIG. 9 shows an example of a camera status table 901 storing fixed information and current information of each individual camera. The table 901 consists of information such as camera numbers, camera names, host names, the coordinates of the camera installation positions on the map, initial directions upon start-up, pan enable angles θp. (a<θp<A), and current directions. The two ends of the pan enable angle are angles a and A, similar to d and D, represented by clockwise angles in a direction x (a predetermined direction on the map plane).

The camera management server 50 constantly checks the camera status table and so monitors that the individual cameras do not rotate beyond the respective pan enable angles. Also, the camera management server 50 periodically sends the contents of the camera status table to the camera control clients 56. On the basis of the information from the camera management server 50, each camera control client 56 updates the direction of each camera icon 66 in the map window 60 displayed on the display 35.

The relationships between the pan enable angle θp (a<θp<A) and the imaging inhibited angle θd (d<θd<D) are classified into five cases described below.

Figure 10A:
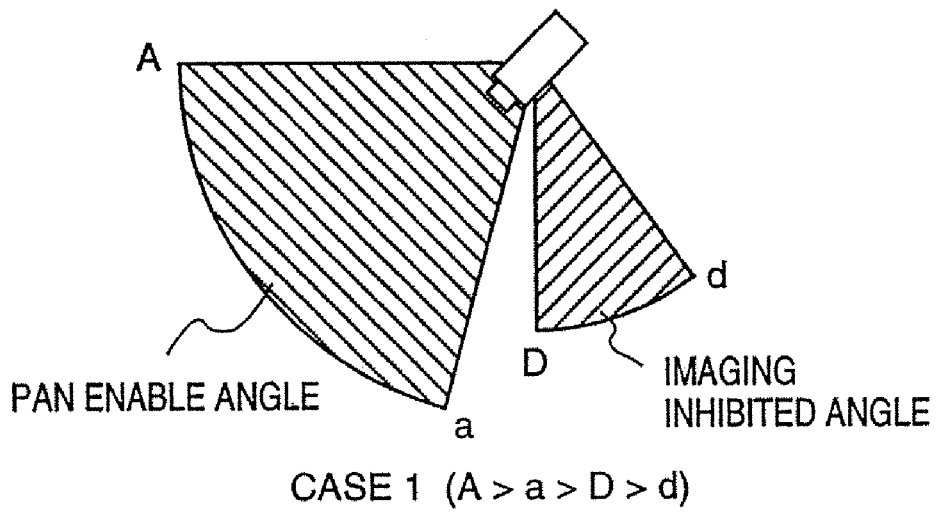
FIGS. 10A and 10B are schematic views showing the relationship between the pan enable direction and the imaging inhibited direction in case 1.
Figure 10B:
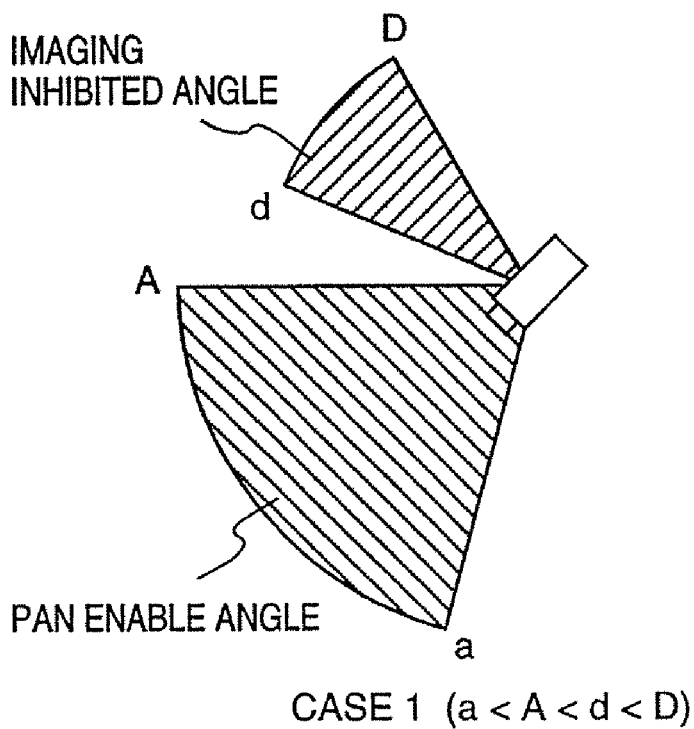

In case 1, A>a>D>d or a<A<d<D as illustrated in FIGS. 10A and 10B. In this case the pan enable angle and the imaging inhibited angle do not overlap at all.

Figure 11:
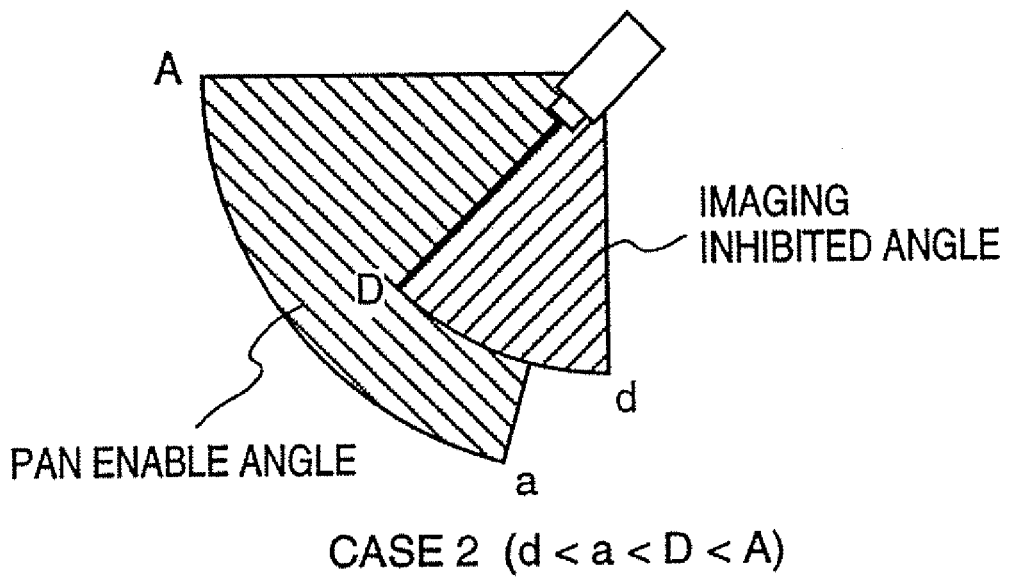
FIG. 11 is a schematic view showing the relationship between the pan enable direction and the imaging inhibited direction in case 2.

In case 2, d<a<D<A as shown in FIG. 11. In this case a portion of the imaging inhibited angle overlaps the pan enable angle.

Figure 12:
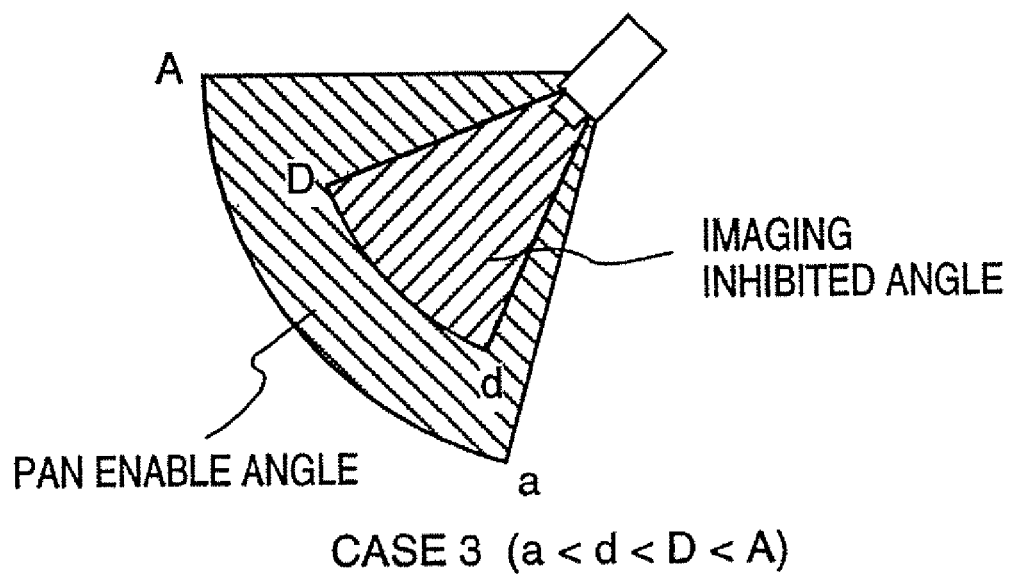
FIG. 12 is a schematic view showing the relationship between the pan enable direction and the imaging inhibited direction in case 3.

In case 3, a<d<D<A as shown in FIG. 12. In this case the imaging inhibited angle is entirely contained in the pan enable angle.

Figure 13:
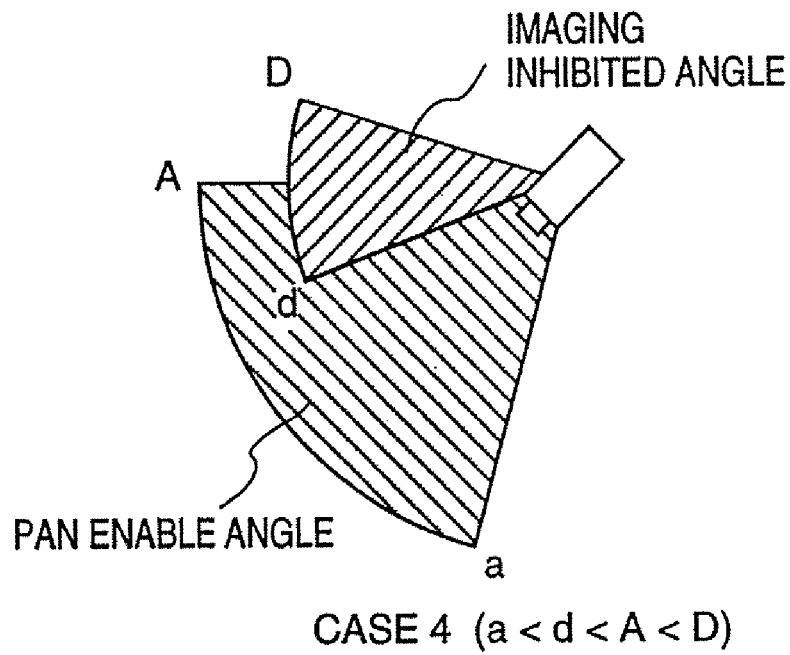
FIG. 13 is a schematic view showing the relationship between the pan enable direction and the imaging inhibited direction in case 4.

In case 4, a<d<A<D as shown in FIG. 13. In this case a portion of the imaging inhibited angle overlaps the pan enable angle.

Figure 14:
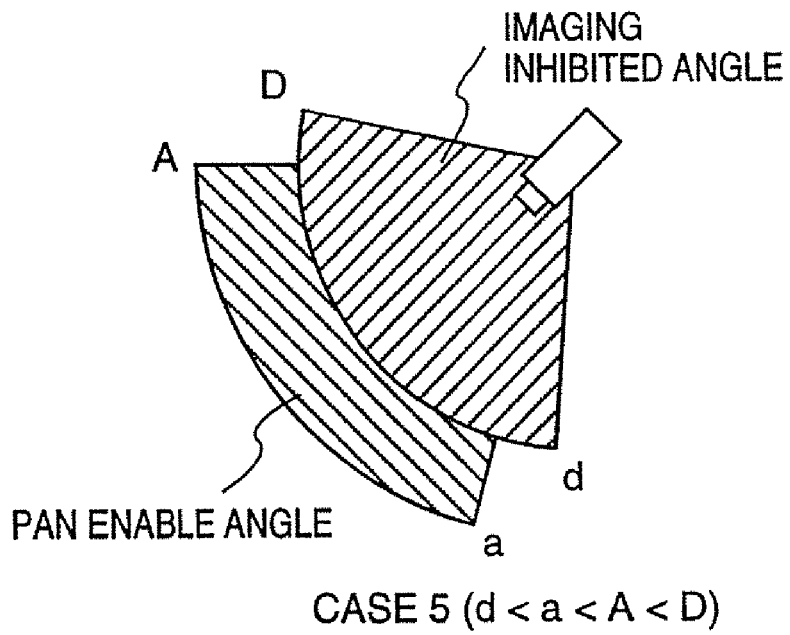
FIG. 14 is a schematic view showing the relationship between the pan enable direction and the imaging inhibited direction in case 5.

In case 5, d<a<A<D as shown in FIG. 14. In this case the pan enable angle is entirely contained in the imaging inhibited angle.

Figure 15:
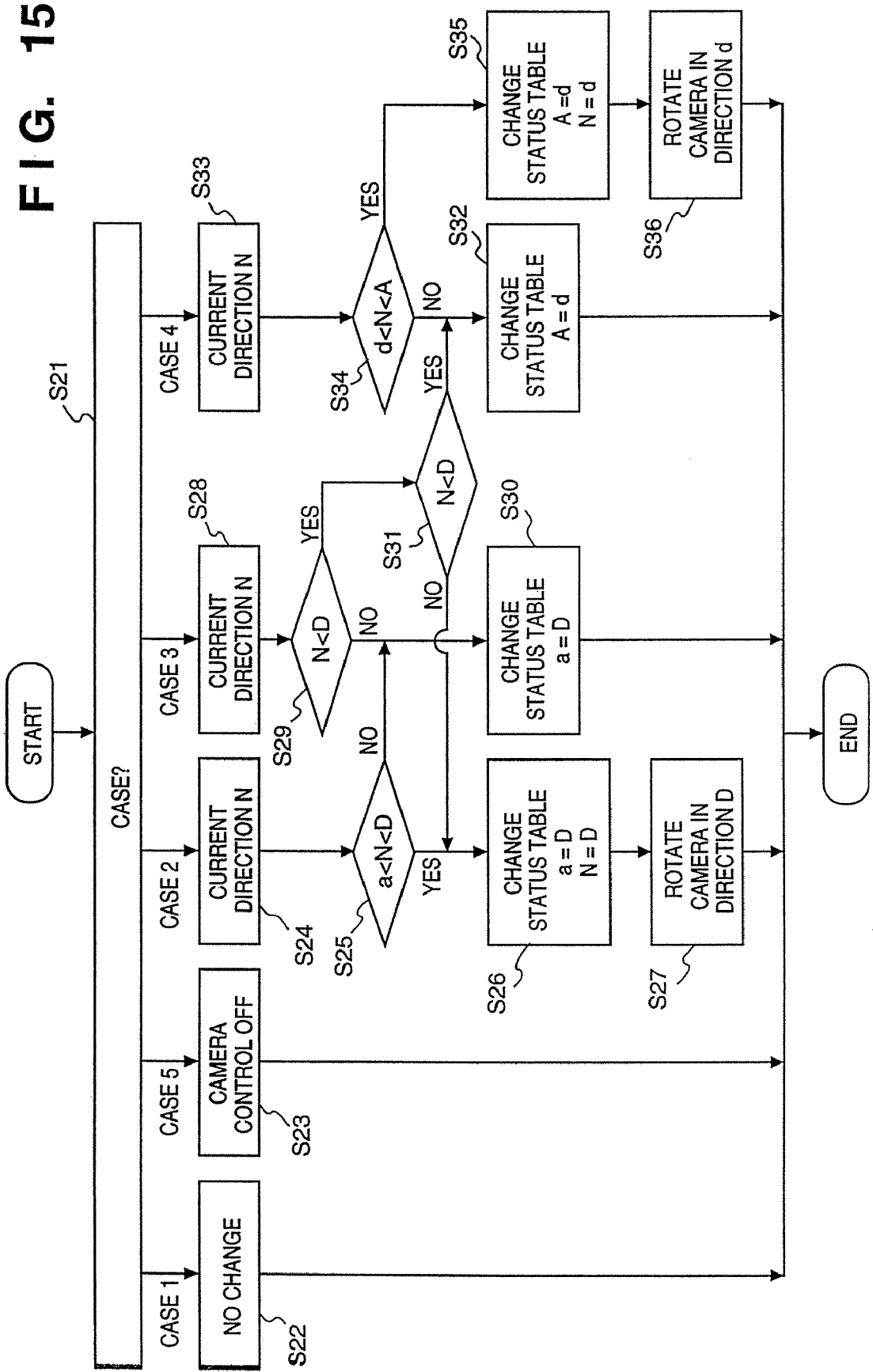
FIG. 15 is a detailed flow chart of step S15 in FIG. 7.

FIG. 15 shows the details of step S15 in FIG. 7. The camera status table 901 and the direction of the camera of interest are changed as follows in accordance with the five cases described above. Assume the current direction of the camera of interest is N.

First, in step S21 which of the five cases is the current case is checked.

If case 1 is determined, this means that the imaging inhibited angle and the pan enable angle do not overlap each other. Accordingly, no change is made (step S22).

If case 5 is determined, this means that the pan enable angle is entirely contained in the imaging inhibited angle. Therefore, control and display of the camera are turned off (step S23).

If case 2 is determined, the current direction N of the camera is checked (step S24). If a<N<D is determined (YES in step S25), this means that the camera is currently aiming in the imaging inhibited area, and so the direction of the camera also needs to be changed. Accordingly, in the camera status table 901 the angle D outside the imaging inhibited angle is substituted into the information of the current camera direction N and into the end portion a of the pan enable angle (step S26). Thereafter, a pan command for aiming the camera in the angle D is issued (step S27).

Cases 3 and 4 are basically the same as case 2. In these cases, the pan enable angle is so changed as not to contain the imaging inhibited angle, and the direction of a camera pointing to the imaging inhibited angle is so changed that the camera does not aim at the imaging inhibited angle (steps S28 to S36). If a camera is pointing to the imaging inhibited angle in case 3, the camera is aimed at the angle D. However, it is also possible to point the camera to the angle d or to a larger end portion by comparing (A-D) with (d-a).

In the above embodiment, the imaging inhibited area is chosen from equally divided areas on the map. However, it is evident that a rectangle with a given size drawn on the map by dragging the mouse can also be set as an imaging inhibited area. In this case each user can set an imaging inhibited area with a given size.

In the above embodiment, after the imaging inhibited area is set, only cameras connected to the local host are chosen as a camera whose pan enable angle and direction of the cameras are to be changed. Accordingly, it is possible to impose limitations on the directions of the cameras in the self-station. Consequently, other users cannot remotely aim the cameras in the self-station in the direction of an area set as the imaging inhibited area. However, if only local cameras are the objects, the number of cameras whose camera operations can be restricted is limited. In situations where a large number of cameras exist, therefore, even if an imaging inhibited area is set it is sometimes possible to take an image of this imaging inhibited area from a camera of another host. Also, it is sometimes necessary to limit the operation of a certain camera from other hosts rather than a local host.

This objective or demand can be achieved by making an extension such that cameras connected to other hosts can also be set as a camera whose pan enable direction and imaging direction are changed in accordance with setting (or change) of an imaging inhibited area. This extension is made as follows.

Camera access permitted hosts are predetermined for each camera. As an example, a permitted host information file as shown in FIG. 16 is formed. If an imaging inhibited area is set on the map of host 1, for example, all cameras connected to all hosts to which a remote operation by host 1 is permitted are retrieved from the permitted host information file and set as objects to be changed. If all host names are set for a certain camera, it is of course possible to inhibit any camera from being aimed at the imaging inhibited area. If this is the case, the imaging inhibited area can never be imaged.

Figure 17:
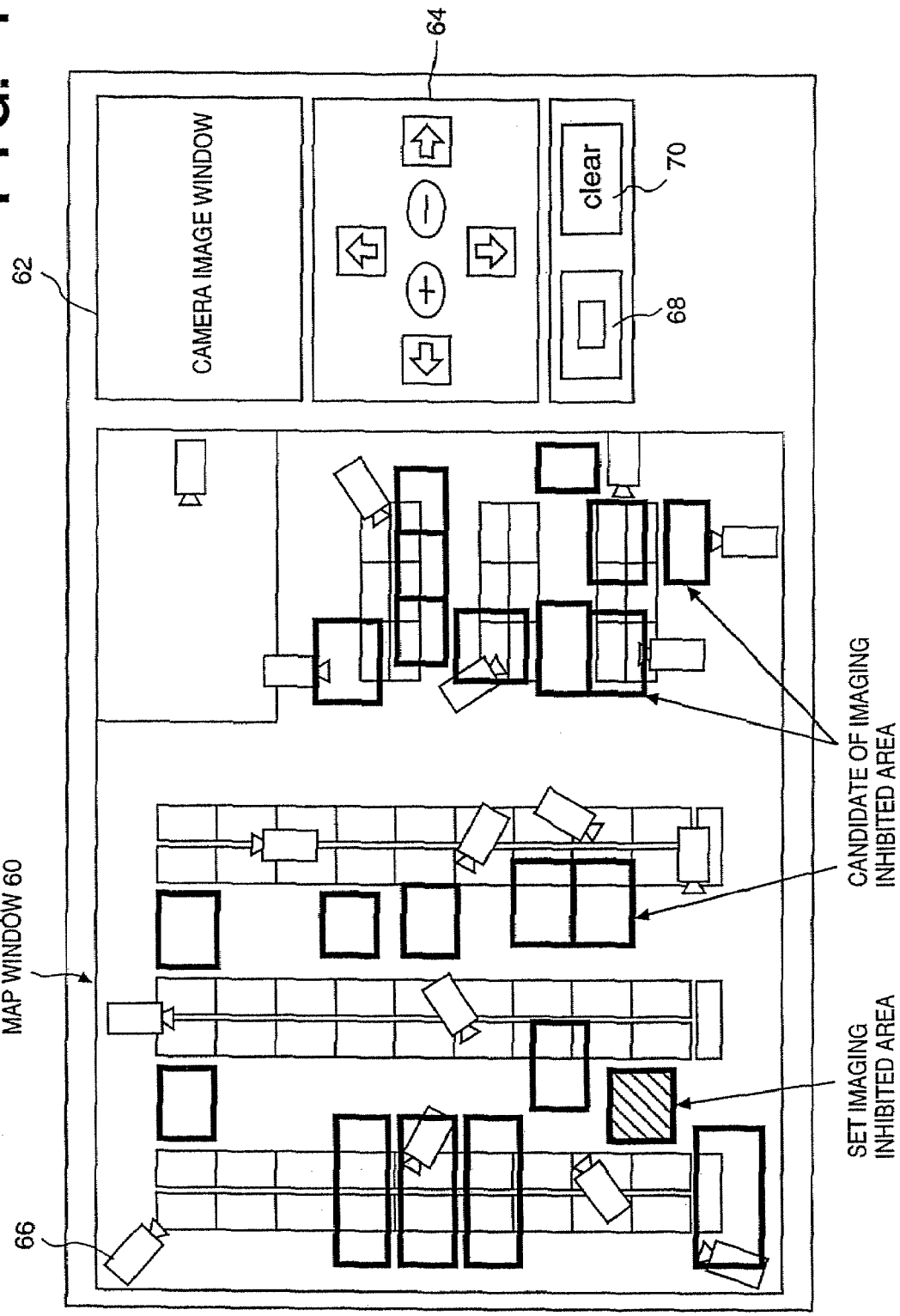
FIG. 17 is a view for explaining another method of setting an imaging inhibited area.

It is unnecessary to select an imaging inhibited area from equally divided areas on the map. For example, as illustrated in FIG. 17, it is possible to preset several areas with arbitrary sizes which may be set as an imaging inhibited area, store the position information of these areas, and, when an imaging inhibited area is to be set (changed), display these areas on the map so that any area can be selected. Accordingly, areas which can be set as an imaging inhibited area and areas which cannot can be distinguished in accordance with the user. As an example, a common place which is strongly public cannot be set as an imaging inhibited area when an imaging inhibited area is set (changed), if the place is not set as a candidate of an imaging inhibited area.

It is also possible to limit cameras (or hosts) whose operations are limited by an imaging inhibited area for each set imaging inhibited area. If this is the case, as illustrated in FIG. 18, a file connecting objective cameras to each set imaging inhibited area is formed. In FIG. 18, if area 1 is chosen as an imaging inhibited area, cameras 1, 2, 3, and 5 are set as cameras whose pan is limited. This allows a rapid retrieval of cameras covering the imaging inhibited area.

In the above description, general users can freely set and cancel an imaging inhibited area. However, it is naturally also possible to permit only a specific manager to do these works. For example, a system manager or a direct manager of an objective camera (e.g., the user of a video communication terminal connected to the camera) can set an imaging inhibited area of each camera under the management and can change and cancel the setting. However, general users cannot set imaging inhibited areas of cameras which they do not manage and cannot change and cancel already set imaging inhibited areas.

As can be readily understood from the above explanation, in the present invention an imaging inhibited area which is inhibited from being imaged by a camera can be set on a map showing the arrangement of cameras. This makes it possible to protect the privacy of each user. Also, an operation for this purpose can be done by a readily understandable interface.

Second Embodiment

The second embodiment of the present invention will be described in detail below with reference to the accompanying drawings.

Figure 19:
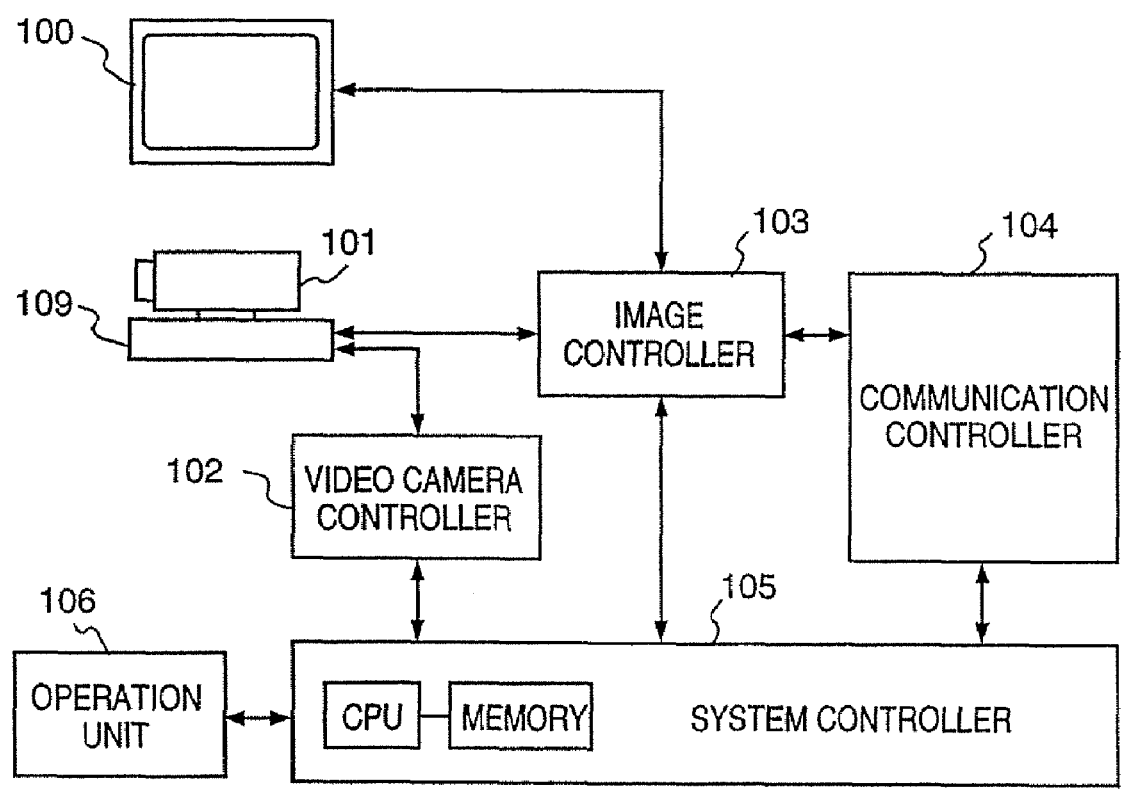
FIG. 19 is a block diagram showing a common configuration applied to the second to fourth embodiments of a video camera controller according to the present invention.

FIG. 19 is a block diagram showing a video communication terminal of this embodiment. A display 100 as a display unit displays a video camera control window 10, FIG. 20. A video camera 101 incorporating a zoom lens can be panned and tilted by a panhead 109 which incorporates a motor (not shown). The motion of the video camera 101 is controlled by a video camera controller 102. An image controller 103 encodes and decodes image signals. A communication controller 104 exchanges image information and video camera control information with a video camera controller installed in a remote place. A system controller 105 controls the overall system. An operation unit 106 as a designating means includes a keyboard, a mouse, and a digitizer and inputs designations to the system controller 105. These controllers constitute a control means according to this embodiment.

The configuration in FIG. 19 is equivalent to setting one video camera and omitting the camera input selector 14 in the configuration in FIG. 1. That is, the system controller 105, the video camera controller 102, the image controller 103, and the communication controller 104 correspond to the video communication terminal 20, the camera control circuit 12, the video board 34, and the network I/F 36, respectively. Accordingly, a plurality of cameras can also be controlled by adding the camera input selector 14 to the configuration in FIG. 19.

Figure 20:
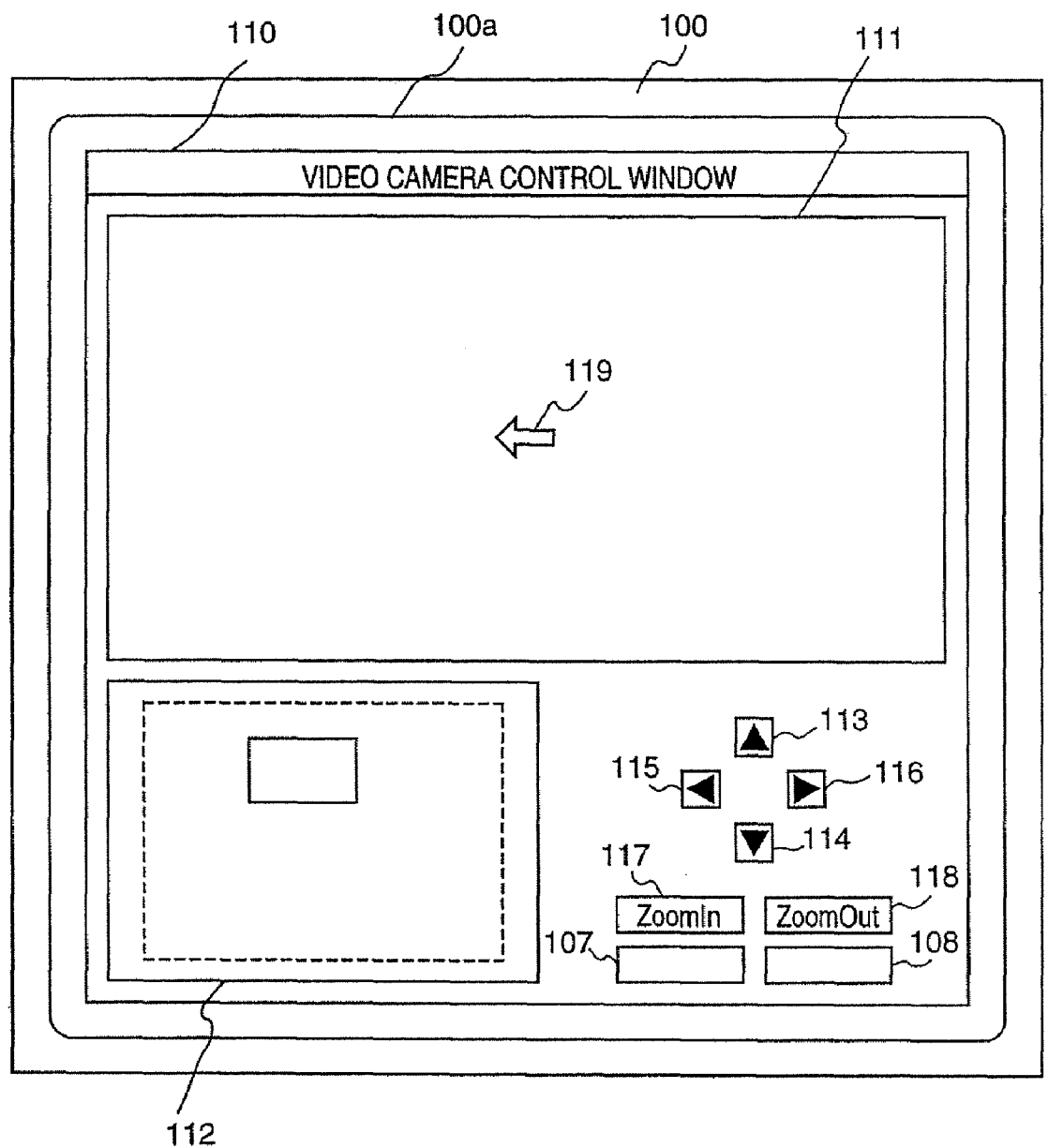
FIG. 20 is a view showing a common graphic user interface applied to the second to fourth embodiments.

FIG. 20 shows a graphical user interface (GUI) on a screen 100a of the display 100.

A video camera control window 110 includes an image display screen 111, a video camera control screen 112, camera direction control buttons 113, 114, 115, and 116, and sensing range (field of view) control buttons 117 and 118. The image display screen 111 displays an image currently being picked-up by the video camera 101. The video camera control screen 112 is used to control the motion of the video camera 101. The camera direction control buttons 113, 114, 115, and 116 are used to change the camera direction upward, to the left, downward, and to the right, respectively, without using the video camera control screen 112. The sensing range control buttons 117 and 118 are used to enlarge and reduce (zoom in and zoom out), respectively, an image of an object. The control window 110 also displays a cursor 119 for operating the control window 110. This cursor 119 is operated by the operation unit 106 (FIG. 1). The control window 110 further includes a button 107 for designating an imaging inhibited range and a clear button 108 for canceling the range designated by the button 107.

Figure 21:
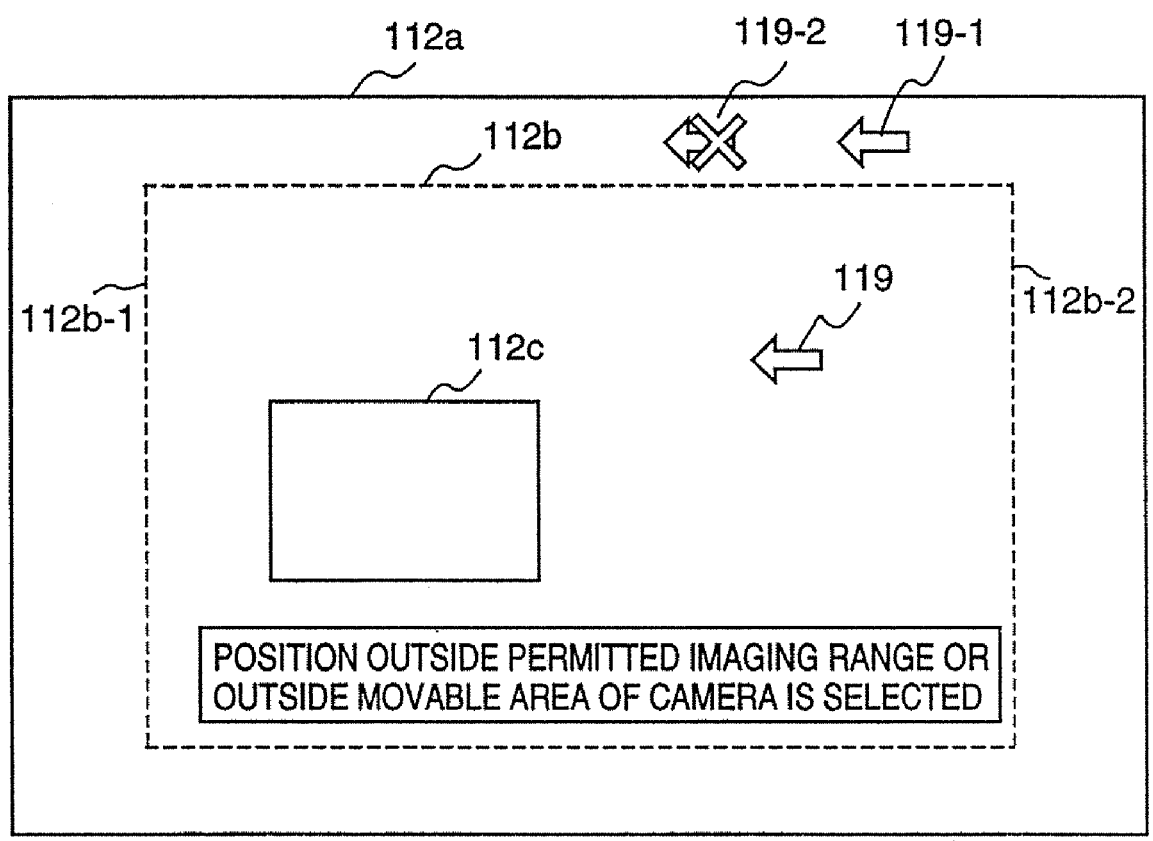
FIG. 21 is a view showing a common video camera control screen applied to the second to fourth embodiments and particularly explaining the second embodiment.

FIG. 21 is an enlarged view of the video camera control screen 112. Referring to FIG. 21, a sensing enable area 112a indicates a range which can be sensed by the video camera 101 when the zoom magnification is minimized (to the widest angle) and panning and tilting are performed over the entire range. The sensing enable area 112a has the same size as the video camera control screen 112. A video camera movable area 112b indicates a range within which the optical axis of the video camera 101 can move. A sensing range display area 112c indicates a position and a range in the sensing enable area 112a which the video camera 101 is currently sensing. Although the size of the sensing enable area 112a is fixed, the sensing range display area 112c changes its size in accordance with the zoom magnification.

The video camera control screen 112 is displayed in place of the map display window 60 in the first embodiment. In the apparatus of this embodiment, it is assumed that one camera is connected to one video communication terminal. Accordingly, by displaying the sensing angle based on the visual field of the connected camera, the sensing enable range and the camera rotatable angle can be shown to the user.

Designation of an imaging inhibited range is done by the button 107. The button 107 has the same function as the button 68 in the first embodiment. When the button 107 is depressed, the map window 60, FIG. 5, in which the arrangement of cameras and already divided areas are drawn is displayed, and an imaging inhibited area is designated on this map. In the same fashion as in the first embodiment, an angle at which cameras are inhibited from being aimed is calculated as shown in FIG. 8 and registered as a camera status table 901, FIG. 9. Although the table in FIG. 9 does not contain a camera tilt angle, in this embodiment it is assumed that the camera status table contains the tilt angle.

When the imaging inhibited area is thus designated, an angle at which a camera is rotatable is displayed on the camera control screen 112, in place of the map window 60, on the basis of the contents of the camera status table. In this case the camera movable area 112a is determined on the basis of a pan enable angle (a, A) registered in the camera status table 901. Note that the pan enable angle and the tilt enable angle excluding the imaging inhibited angle will be collectively referred to as a camera movable range hereinafter.

Figure 22:
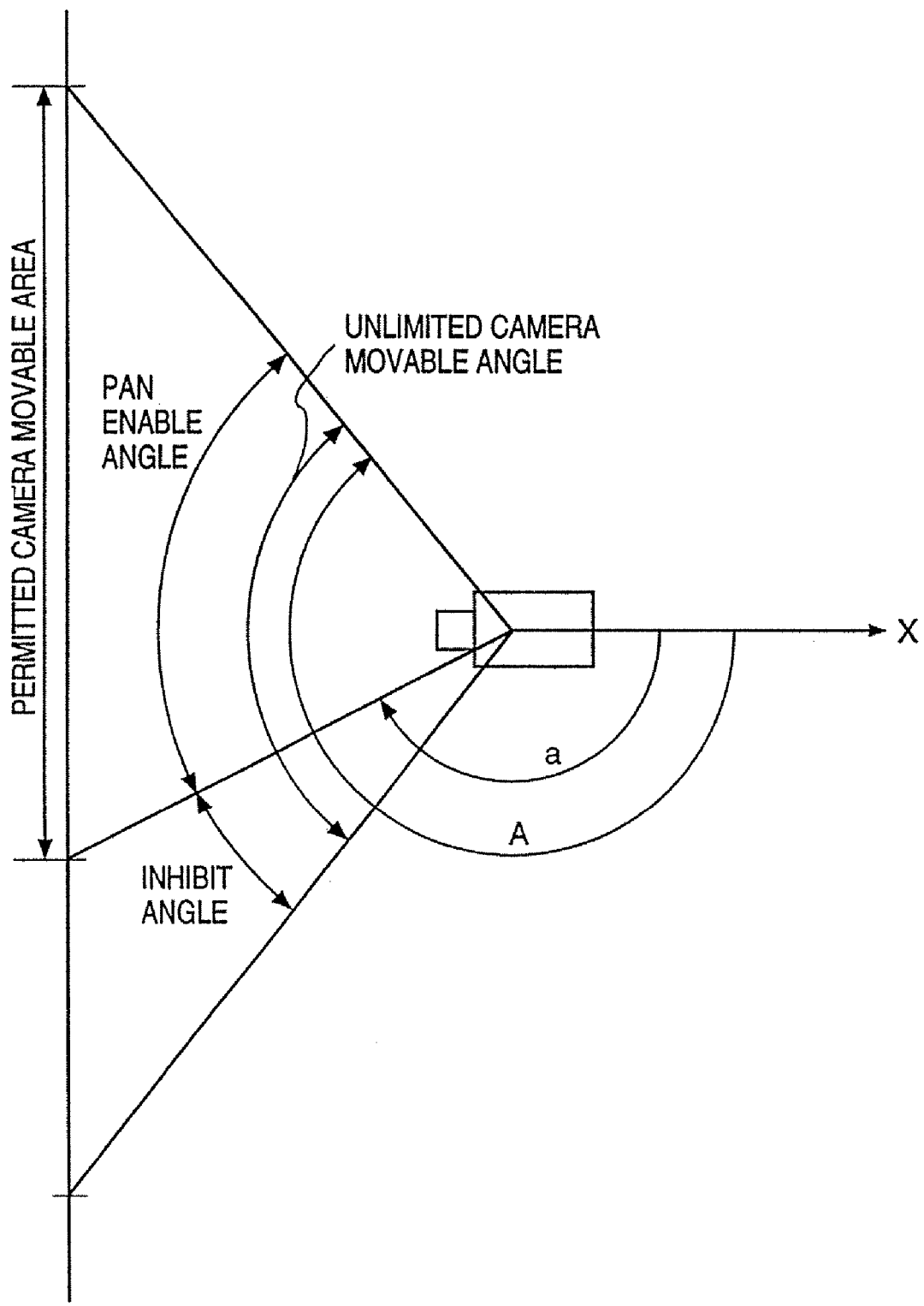
FIG. 22 is a view showing an example of determination of the camera movable range.

FIG. 21 shows an example in which no imaging inhibited area is designated. If an imaging inhibited area is designated, as shown in FIG. 22, a permitted camera movable range is obtained by projecting the pan enable range of the camera onto a plane. This corresponds to the position and length in the horizontal direction of the camera movable area 112b and determines the positions of vertical lines 112b-1 and 112b-2 of the area 112b.

An imaging inhibited area also can be designated on the camera control screen 112 in FIG. 21. That is, the camera movable area is directly designated by an operator by dragging the vertical line 112b-1 or 112b-2 and moving the line to a desired position by using the mouse. In this case the angles (A, a) at the two ends of the pan enable angle are calculated from the permitted camera movable area by a procedure which is the reverse of the procedure in FIG. 22.

A control procedure performed by the system controller 105 when an operator operates the camera on the camera control screen 112 thus obtained will be described below with reference to the flow chart in FIG. 23.

The user operates the video camera control screen 112, the camera direction control buttons 113 to 116, or the sensing range control buttons 117 and 118 in the video camera control window 110 by using the cursor 19, thereby controlling the video camera 110 to take an image of a desired location (step S230).

The coordinates of the selected camera direction are detected (step S231). An area on the camera control screen in which the selected coordinates are present is checked (step S232).

In this embodiment, if the user selects a position outside the video camera movable area on the video camera control screen 112 in FIG. 21 by using the cursor 119 (119-1), an error is determined because the selected position is outside the video camera movable area, and nothing is done for the operation control of the video camera 101. Preferably, to inform the user that the selection is an error, a message "position outside camera movable area is selected" is displayed on the video camera control screen 112 (step S234). It is also possible, without displaying this message, to inform the user that the position cannot be selected, by replacing the cursor 119-1 indicating the position outside the video camera optical axis movable area with a symbol indicated by reference numeral 119-2, which is a cursor with a mark "x" on it.

On the other hand, if the designated direction is within the camera movable area, the camera is aimed in that direction, and the camera status table is updated (steps S233 and S237). If the object camera to be operated is a remote-controlled camera, control information for rotating the camera is transmitted to a system control unit of the object camera (step S236).

With the above control it is possible to prevent a damage to the panhead 109 even if the selected position is outside the video camera movable area. Also, an error message is displayed although the video camera 101 does not move, so the user can instantly know that the selection is an error.

It is readily possible to determine that the selected place is outside the video camera movable area, when the system controller 105 calculates the coordinates of the selected place and detects that the calculated coordinates are outside the video camera movable area 112b and inside the imaging enable area 112a. More specifically, a method in the third embodiment is applicable. If the system controller 105 detects that the selected place is outside the video camera movable area, the message described above can be displayed on the display 100 via the image controller 103.

In the above embodiment, the video camera 101 is not operated if the selected place is outside the video camera movable area. However, the following effect can be obtained by operating the video camera controller 102 to set zooming of the video camera 101 to the widest-angle without panning and tilting the camera. That is, the user selected the place because he or she wanted to see the place. Therefore, it is desirable that the selected place be displayed even though the place is not displayed in the center of the screen. If the optical axis of the video camera 101 positions at the edge portion of the video camera movable area 112b, an image of the selected place (outside the camera movable area, in this case) can sometimes be displayed by setting zooming of the camera to the widest-angle. If this is the case the desire of the user is satisfied.

Third Embodiment

Figure 23:
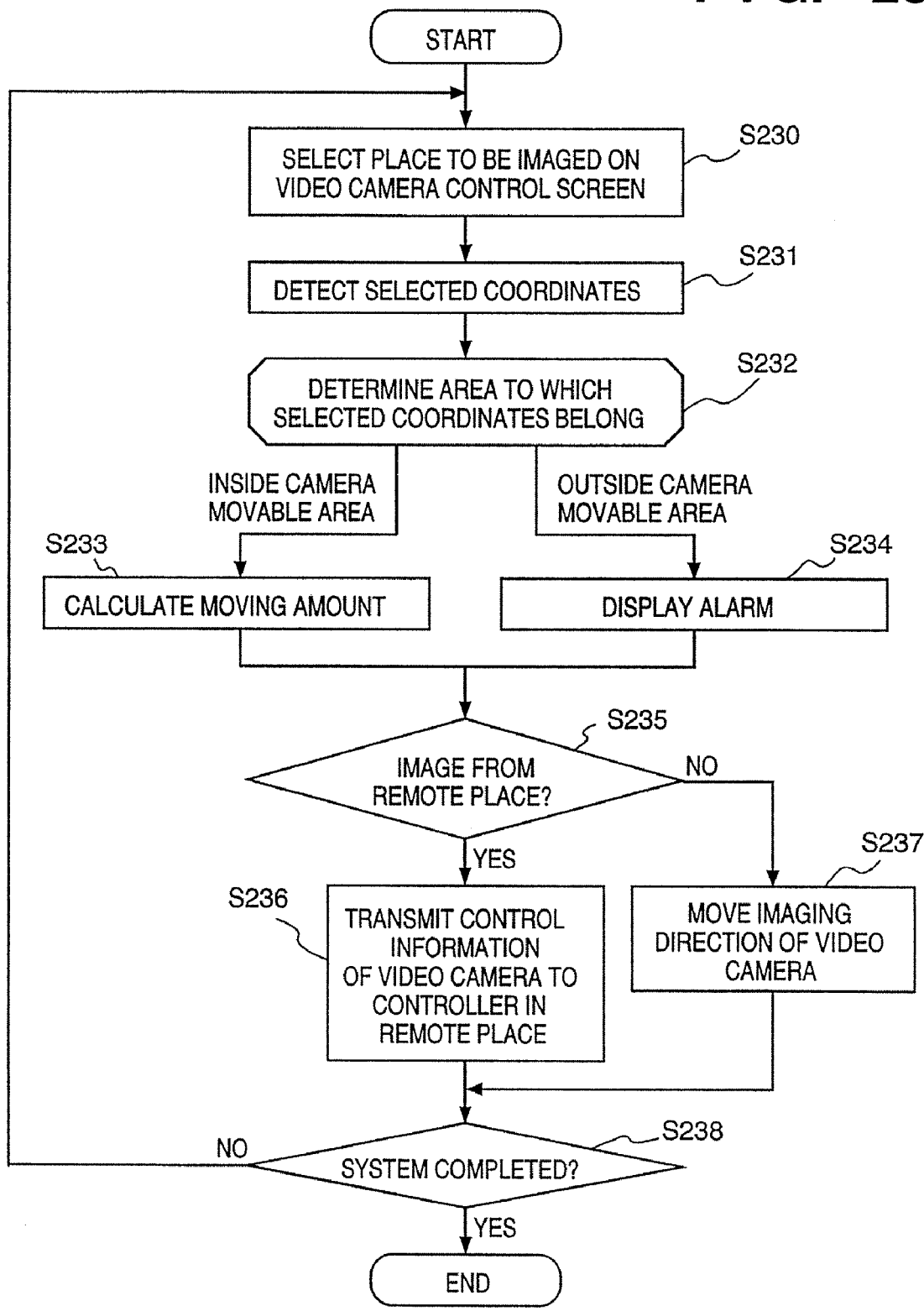
FIG. 23 is a flow chart showing the operation of the second embodiment.

In this embodiment, the content in step S235 of FIG. 23 in the second embodiment is changed. In the second embodiment, as described above, even if the place selected by the user is outside the video camera movable area, the user selected the place because he or she wanted to see the place. Therefore, it is desirable that the selected place be displayed even though the place is not displayed in the center of the screen. In this embodiment, this desire is positively satisfied. This embodiment will be described in detail below with reference to the accompanying drawings. Note that the system configuration is identical with that of the second embodiment shown in FIG. 19 and the GUI is also similar to that of the second embodiment shown in FIG. 20, and so detailed descriptions thereof will be omitted.

Figure 24A:
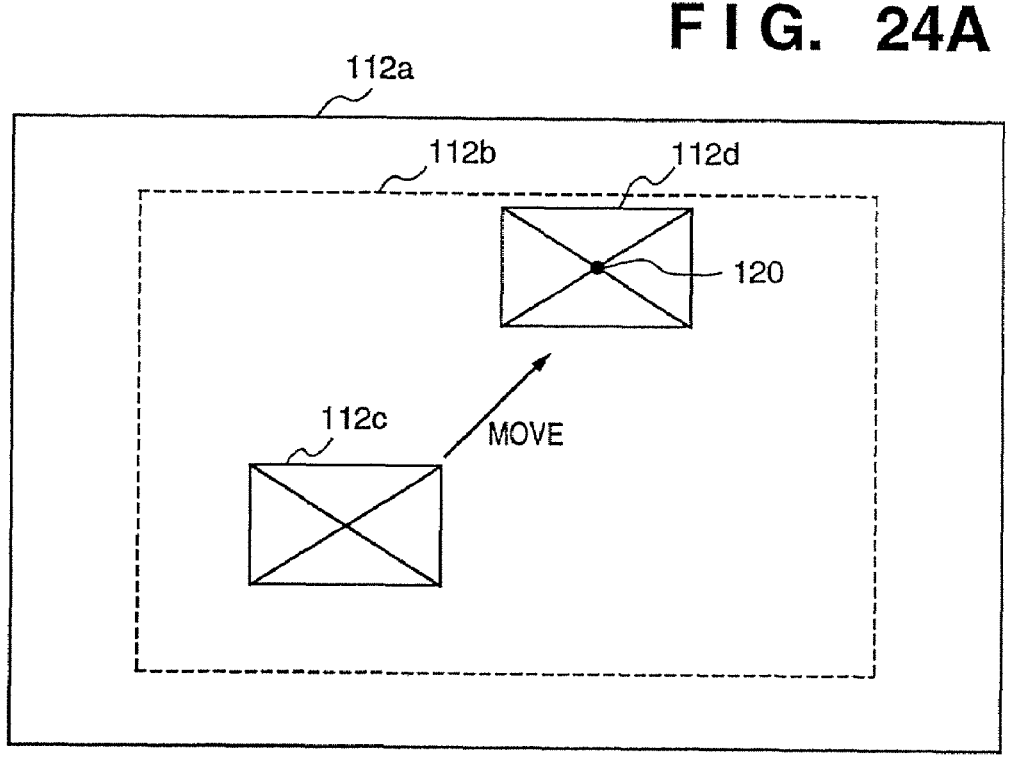
FIGS. 24A and 24B are views showing an outline of the operation of the third embodiment.
Figure 24B:
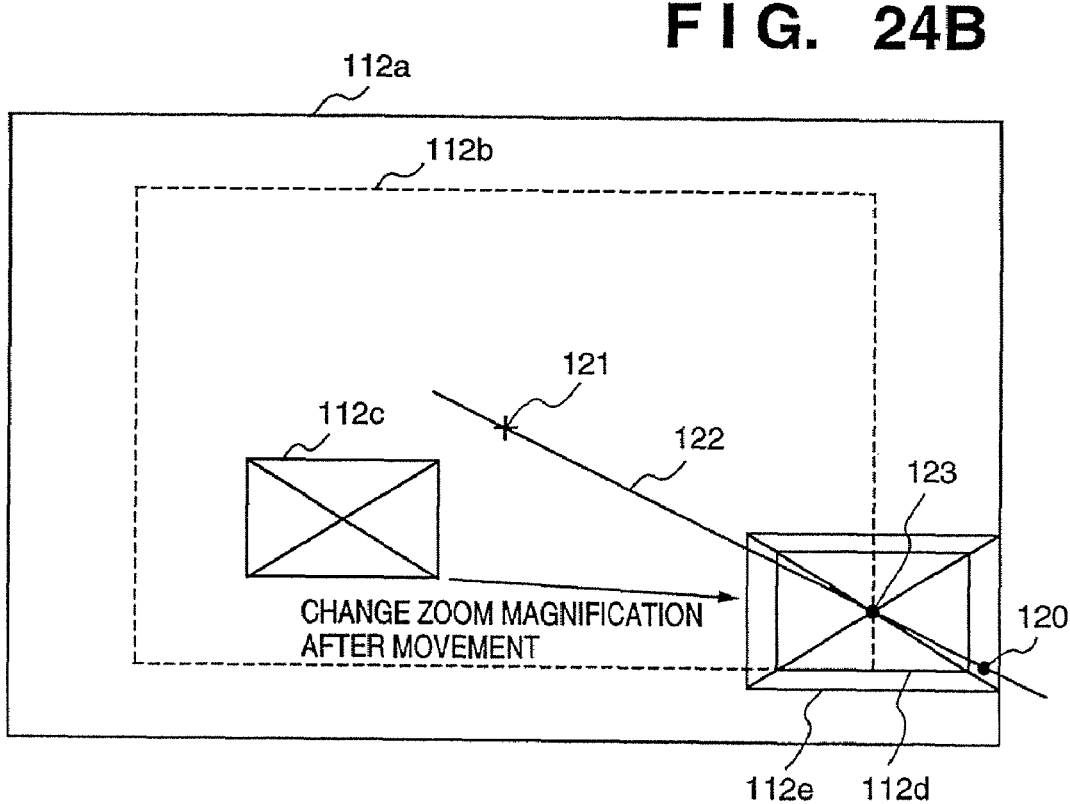

FIGS. 24A and 24B illustrate operations on a video camera control screen 112. FIG. 24A shows a normal operation in which the user selects a position inside a video camera movable area 112b as a new object to be sensed. FIG. 24B shows a case where the user selects a position outside the video camera movable area 112 as a new object to be sensed.

Referring to FIG. 24A, a cursor 119 is moved by an operation unit 106 such as a mouse to select a predetermined position, a coordinate point 120 in this case, thereby moving an imaging range display area from an area 112c to an area 112d. An image in this new area 112d is displayed on an image display screen 111 (FIG. 20). In this case the zoom magnification is not altered and the imaging direction of a video camera 101 is so changed that the selected coordinate point 120 is displayed in the center of the screen.

In FIG. 24B, as in the case of FIG. 24A, the sensing range display area is moved from the area 112c to the area 112d by selecting the coordinate point 120. Since the selected coordinate point 120 is outside the video camera movable area 112b, it is not possible to change the sensing direction of the video camera 101 toward that position. Therefore, an intersection 123 of a straight line 122 connecting a central coordinate point 121 of an imaging enable area 112a and the selected coordinate point 120 and the frame of the video camera movable area 112b is set as a new imaging screen center. However, if the camera direction is changed without changing the zoom magnification, the selected coordinate point 120 (in FIG. 24B) sometimes does not come into the sensing range as indicated by the positional relationship between the sensing range display area 112d and the selected coordinate point 120. Therefore, the zoom magnification is minimized (to the widest angle). By the above control, the selected coordinate point 120 is contained in an area 112e broader than the sensing range display area 112d, and this makes sensing at the selected coordinate point 120 possible.

Figure 26:
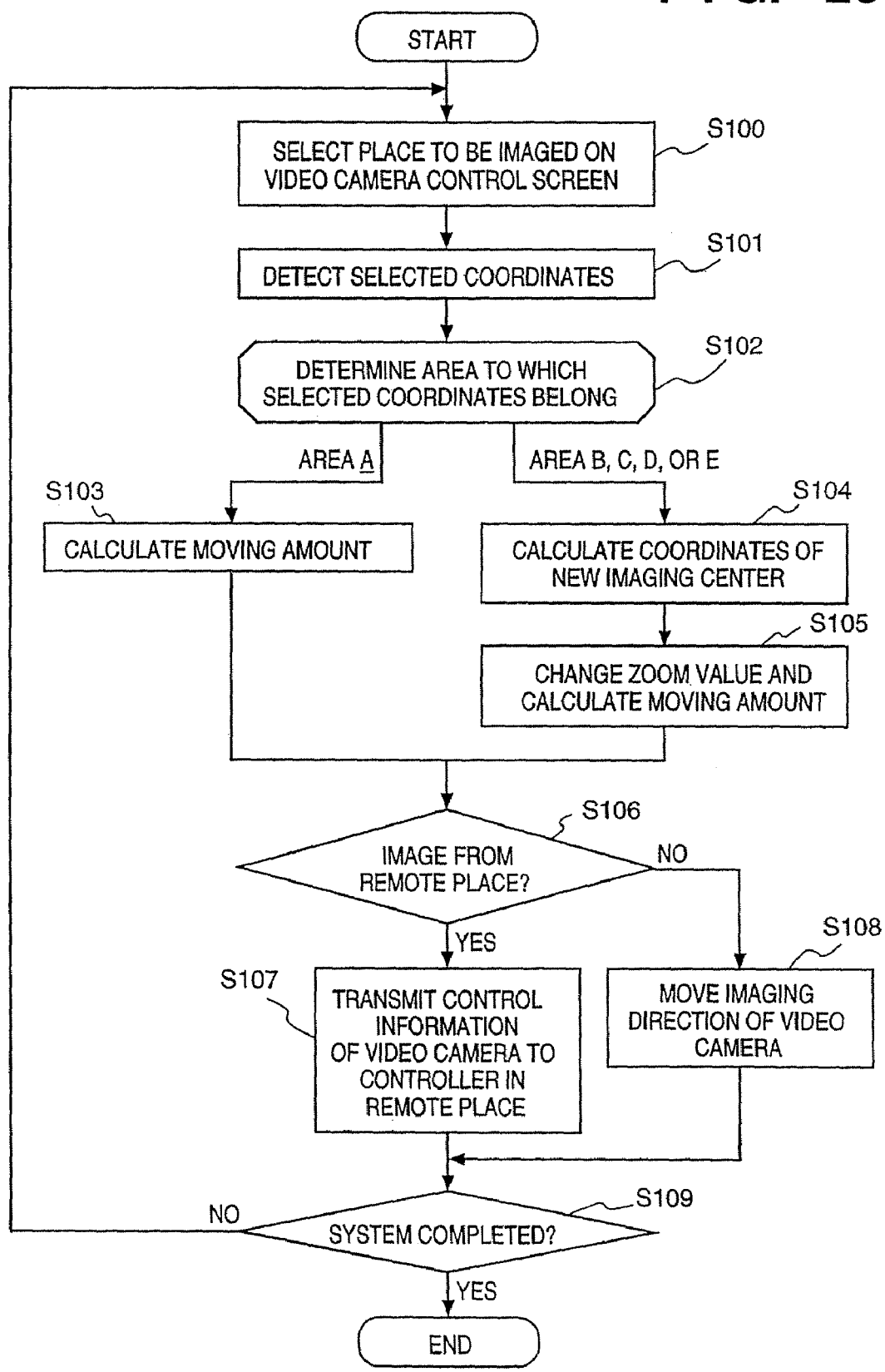
FIG. 26 is a flow chart for explaining the operation of the third embodiment.

Details of the operation of the video camera control method in this third embodiment will be described below with reference to FIGS. 25 and 26. FIG. 25 illustrates the sensing enable area 112a as a plane having a size of m×n. Coordinates are written in this plane, and the plane is divided into a plurality of areas. Reference numerals in FIG. 25 are the same as in FIG. 24B. FIG. 26 is a flow chart showing the operation of a system controller 105. Corresponding step numbers are given in parentheses.

The user operates the operation unit 106 to move the cursor 119 in a video camera control window 110 on a screen 110a of a display 100, selecting a place to be sensed (step S100).

The system controller 105 detects coordinates (Xp,Yp) 120 of the position of the cursor 119 when the place to be sensed is selected in step S100 (step S101).

The system controller 105 checks which of areas A, B, C, D, and E the selected coordinate point (Xp,Yp) 120 belongs to (step S102).

If the system controller 105 determines in step S102 that the selected coordinate point (Xp,Yp) 120 is within the area A, i.e., the video camera movable area 112b, it is unnecessary to change the zoom value. Accordingly, the system controller 105 calculates the moving amount of the video camera (step S103).

On the other hand, if the system controller 105 determines in step S102 that the selected coordinate point (Xp,Yp) 120 is in any of the areas B, C, D, and E outside the video camera movable area 112b, the system controller 105 calculates coordinates of a new sensing center 123 (step S104). For example, if it is determined that the selected coordinate point (Xp,Yp) 120 is in the area B as illustrated in FIG. 25, the new sensing center (the position of the optical axis of the video camera 101) 123 is calculated as follows.

That is, assuming the coordinates of the center in the sensing enable area 112a are (Xc,Yc), the straight line 122 passing the selected coordinate point (Xp,Yp) 120 and the central coordinate point (Xc,Yc) 121 is given by $$(y-Yc)(Xp-Xc)=(x-Xc)(Yp-Yc)$$

Since the frame of the video camera movable area 112b in contact with the area B is $$y=Yb$$

the coordinates of the new imaging center 123 as an intersection of the straight line 122 and the frame of the video camera movable area 112b are calculated by $$((Yb-Yc)(Xp-Xc)/(Yp-Yc)+Xc,Yb)$$

The system controller 105 then calculates the amount of movement to the new sensing center 123 calculated in step S104. If an operation of minimizing the zoom magnification (to the widest angle) is also to be performed, the system controller 105 performs a calculation for the operation (step S105).

Subsequently, the system controller 105 checks whether the video camera 101 as an object to be controlled is connected to a video camera controller in a remote place or can be controlled by the controller 105 (step S106).

If the system controller 105 determines in step S106 that the video camera 101 is connected to a video camera controller in a remote place, the system controller 105 transmits the video camera control information calculated in step S103 or S105 to the video camera controller in the remote place via a communication controller 104 (step S107).

If the system controller 105 determines in step S106 that the video camera 101 can be controlled by the controller 105, the system controller 105 moves the camera direction and changes the zoom magnification of the video camera 101 on the basis of the control information of the video camera 101 calculated in step S103 or S105 (step S108).

By repeating the operation from step S100 to step S108 described above, it is possible to pick-up an image of a given object located in the sensing enable range of the video camera 101 as an object to be controlled.

In the processing of this embodiment, interrupt is accepted. Interrupt occurs when the user completes the operation of the system (step S109), and the processing is ended.

In this embodiment as described above, even if a place selected by the user is outside the video camera movable area, the video camera 101 is moved to the limit toward the position selected by the user and stopped at that limiting position, and an image corresponding to the field of view of the video camera 101 is displayed. Accordingly, no additional load is applied on the camera driver and an image of the selected place or of the selected place and its vicinity is taken (displayed). Consequently, the desire of the user to see the selected place can be satisfied. Also, the camera cannot be pointed to the designated imaging inhibited area even if the user attempts to aim the camera in that direction.

Furthermore, when the zoom magnification is minimized (to the widest angle), an image of the selected place can be reliably taken (displayed).

Fourth Embodiment

The fourth embodiment is obtained by further improving the third embodiment. This fourth embodiment will be described below with reference to the accompanying drawings. The configuration, GUI, and video camera control screen of a video camera controller are the same as in the second and third embodiments, and so FIGS. 19, 20, and 21 are again used for these parts.

Figure 27:
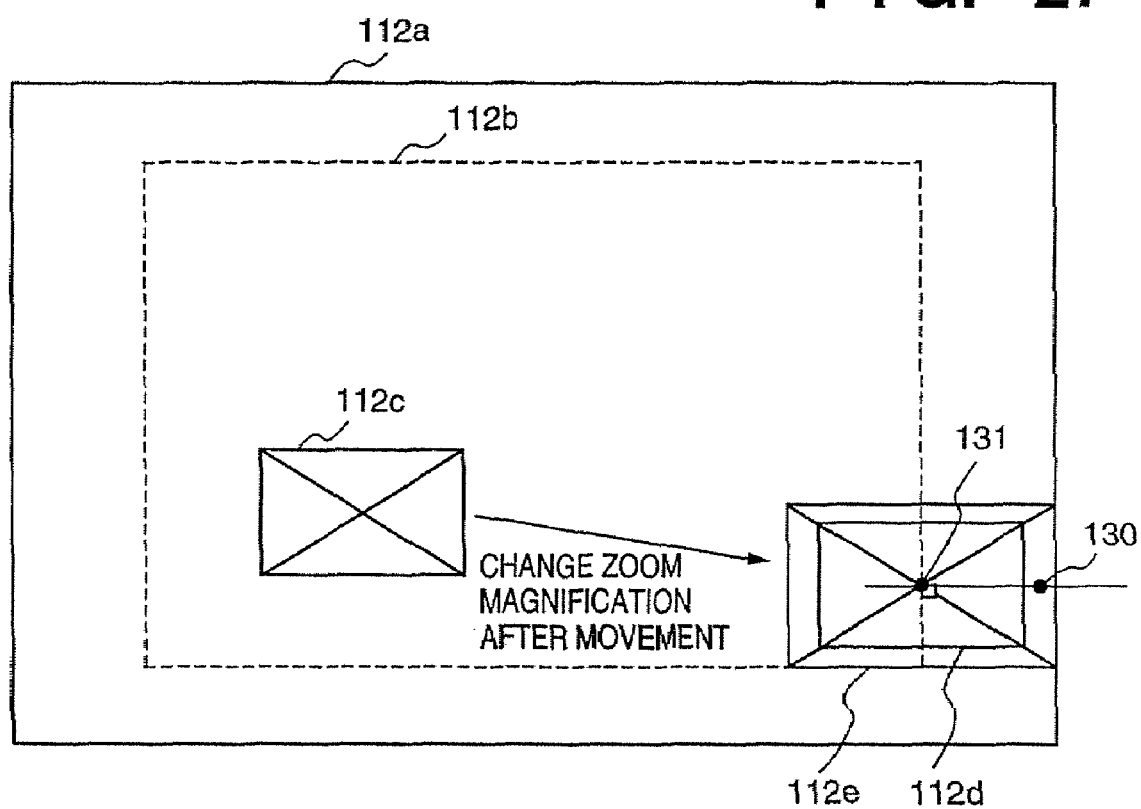
FIG. 27 is a view showing an outline of the operation of the fourth embodiment.

An outline of the operation of a video camera control method according to the fourth embodiment will be described with reference to FIG. 27. FIG. 27 shows an operation on the video camera control screen, FIG. 21. Note that an operation when the user selects a video camera movable area as a new object to be imaged is the same as the operation, FIG. 24A, explained in the third embodiment, and so a detailed description thereof will be omitted.

FIG. 27 shows an example when the user selects a position outside the video movable area as a new object to be sensed. In FIG. 27, it is impossible to change the direction of a video camera 101 such that a selected coordinate point 130 comes to the center of the screen, since the selected coordinate point is outside a video camera movable area 112b. Therefore, a point 131 on the frame of the video camera movable area 112b, which is closest to the selected coordinate point 130, is set as the center of a new sensing range. However, if the camera direction is changed without changing the zoom magnification, the selected coordinate point 130 sometimes does not come into the sensing range as indicated by the positional relationship between a sensing range display area 112d and the selected coordinate point 130. Therefore, the zoom magnification is minimized (to the widest angle). By the above control, the selected coordinate point 130 is included in a sensing range display area 112e, and this makes scene sensing possible.

Figure 28:
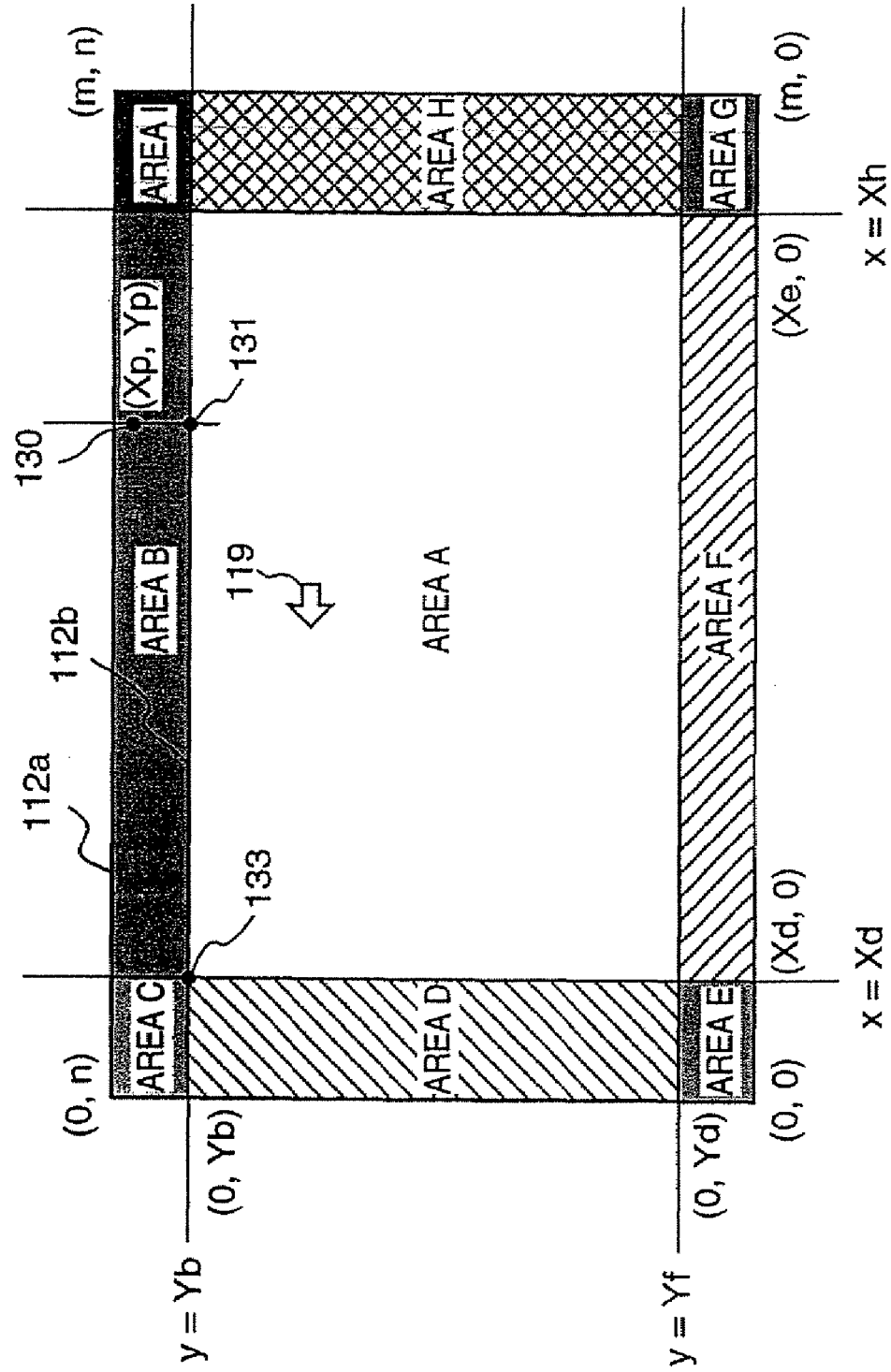
FIG. 28 is a view for explaining the operation of the fourth embodiment.
Figure 29:
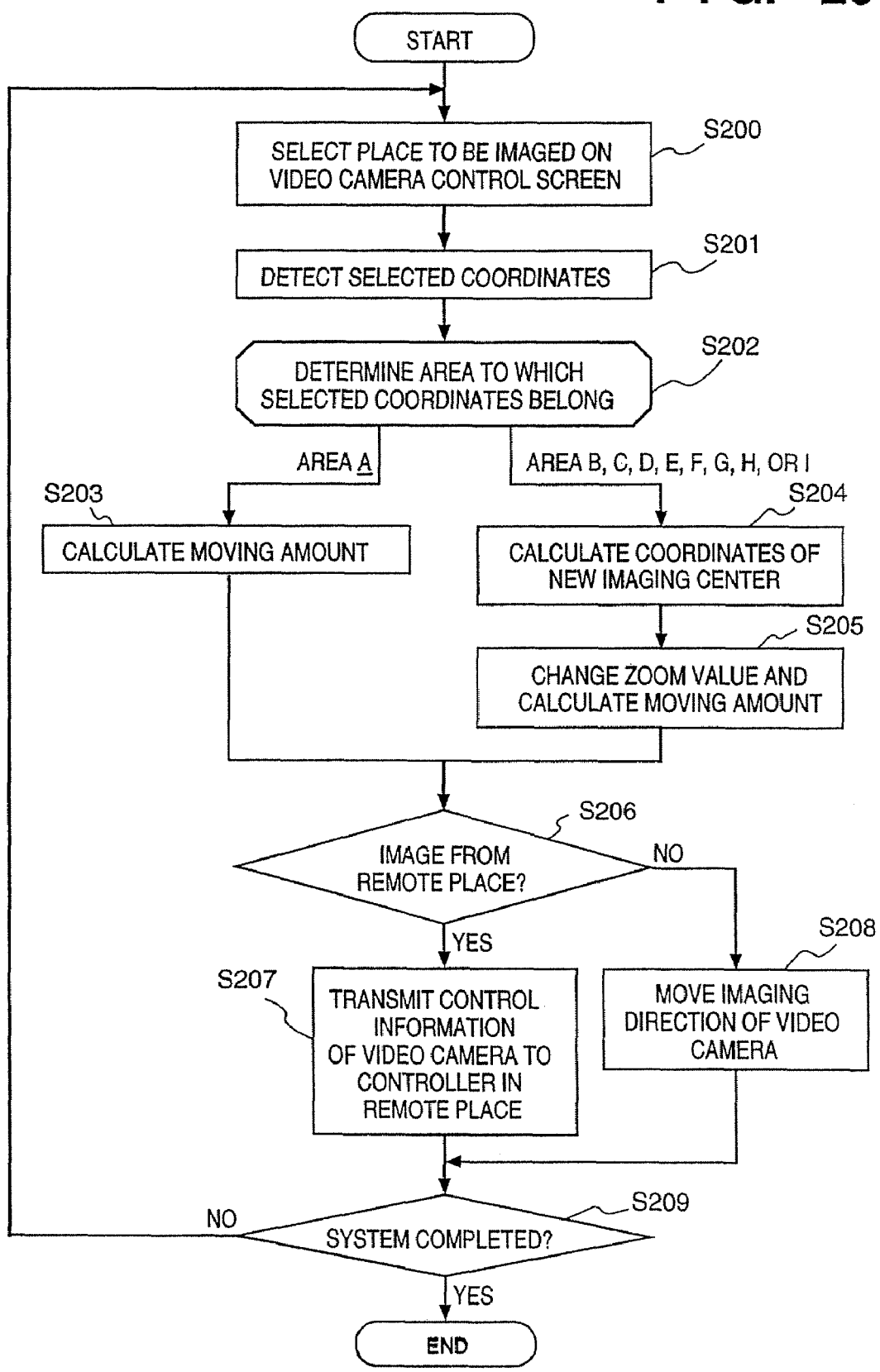
FIG. 29 is a flow chart for explaining the operation of the fourth embodiment.

Details of the operation of the video camera control method according to the fourth embodiment will be described below with reference to FIGS. 28 and 29. FIG. 28 illustrates a sensing enable area 112a as a plane having a size of m×n. Coordinates are written in this plane, and the plane is divided into a plurality of areas. Reference numerals in FIG. 28 are the same as in FIG. 27. FIG. 29 is a flow chart showing the operation of a system controller 105.

The user operates an operation unit 106 to move a cursor 119 in a video camera control window 10 on a screen 100a of a display 100, selecting a place to be sensed (step S200).

The system controller 105 detects the coordinates (Xp,Yp) of the position of the cursor 119 when the place to be sensed is selected in step S200 (step S201).

Subsequently, the system controller 105 checks which of areas A, B, C, D, E, F, G, H, and I the selected coordinate point 130 (Xp,Yp) belongs to (step S202).

If the system controller 105 determines in step S202 that the selected coordinate point (Xp,Yp) is within the area A, i.e., the video camera movable area 112b, it is not necessary to change the zoom value. Accordingly, the system controller 105 calculates only the moving amount of the video camera 101 (step S203).

If the system controller 105 determines in step S202 that the selected coordinate point 130 (Xp,Yp) is within any of the areas B, C, D, E, F, G, H, and I outside the video camera movable area 112b, the system controller 105 calculates the coordinates of the center 131 of the new sensing range (step S204). A method of calculating the center 131 of the new sensing range when it is determined that the selected coordinate point 130 (Xp,Yp) is in the area B as illustrated in FIG. 28 is as follows.

The point 131 on the frame of the video camera movable area 112b, which is closest to the selected coordinate point 130 (Xp,Yp), can be easily obtained by (Xp,Yb)

since the point 131 is the intersection of a boundary line y=Yb between the area B and the video camera movable area 112b and a perpendicular x=Xp from the selected coordinate point 130 (Xp,Yp) to the straight line y=Yb. That is, when the area B is selected, the X coordinate of the new position of the video camera 101 can be determined from the selected coordinate point 130 (Xp,Yp), and the Y coordinate is unconditionally Yb. Similarly, when the area F is chosen the Y coordinate is unconditionally Yf. When the areas D and H are chosen, the X coordinates are unconditionally Xd and Xh, respectively, although the Y coordinates are respective designated values.

When the selected coordinate point 130 belongs to any of the areas C, E, G, and I, the coordinate point at the corner of the video camera movable area 112b, which is closest to the selected coordinate point 130, is unconditionally set as the new center point 131 without performing the above calculations. For example, if the coordinate point (Xp,Yp) is contained in the area C, a corner point 133 is set as the imaging center.

The system controller 105 then minimizes the zoom magnification (to the widest angle) and calculates the amount of movement to the new center point 131 calculated in step S204 (step S205).

Subsequently, the system controller 105 checks whether the video camera 101 as an object to be controlled is connected to a video camera controller in a remote place or can be controlled by the controller 105 (step S206).

If the system controller 105 determines in step S206 that the video camera is connected to a video camera controller in a remote place, the system controller 105 transmits the video camera control information calculated in step S203 or S205 to the video camera controller in the remote place via a communication controller 104 (step S207).

If the system controller 105 determines in step S206 that the video camera 101 can be controlled by the controller 105, the system controller 105 changes the camera direction and the zoom magnification of the video camera 101 on the basis of the control information of the video camera 101 calculated in step S203 or S205 (step S208).

By repeating the operation from step S200 to step S208 described above, it is possible to take an image of a given object located in the sensing enable range of the video camera 101 as an object to be controlled.

In the processing of this embodiment, interrupt is accepted. Interrupt occurs when the user completes the operation of the system (step S209), and the processing is ended.

In this embodiment as described above, even if a place selected by the user is outside the video camera movable area, the video camera 101 is moved to the limit toward the position selected by the user and stopped at that limiting position, and the zoom magnification of the video camera 101 is minimized (to the widest angle). Accordingly, no additional load is applied on the camera driver and an image of the selected place is picked-up (displayed). Consequently, the desire of the user to see the selected place can be satisfied. Also, the camera cannot be pointed in an imaging inhibited area.

In the systems of the first to fourth embodiments as described above, even if a place selected by the user is outside the video camera movable area, the driver for changing the direction of a video camera is not damaged. Also, the user can limit the camera movable range, and the camera cannot be pointed in that direction.

Additionally, the user can instantly know that the selection is an error even though the video camera does not move.

Furthermore, even if a place selected by the user is outside the video camera movable area, the video camera is moved to the limit toward the position selected by the user and stopped at that limiting position, and an image corresponding to the view angle of the video camera is displayed. Accordingly, no additional load is applied on the camera driver and an image of the selected place or of the selected place and its vicinity is picked-up (displayed). Consequently, the desire of the user to see the selected place can be satisfied.

An image of the selected place can be reliably picked-up (displayed).

An area outside the video camera movable area can be processed as four portions, and this facilitates the processing.

An area outside the video camera movable area can be divided into a plurality of areas, and each individual area can be unconditionally processed.

Fifth Embodiment

The fifth embodiment of the present invention will be described in detail below with reference to the accompanying drawings. This embodiment relates to a technique by which an object to be sensed is changed without moving a camera in the systems of the first to fourth embodiments.

Figure 30:
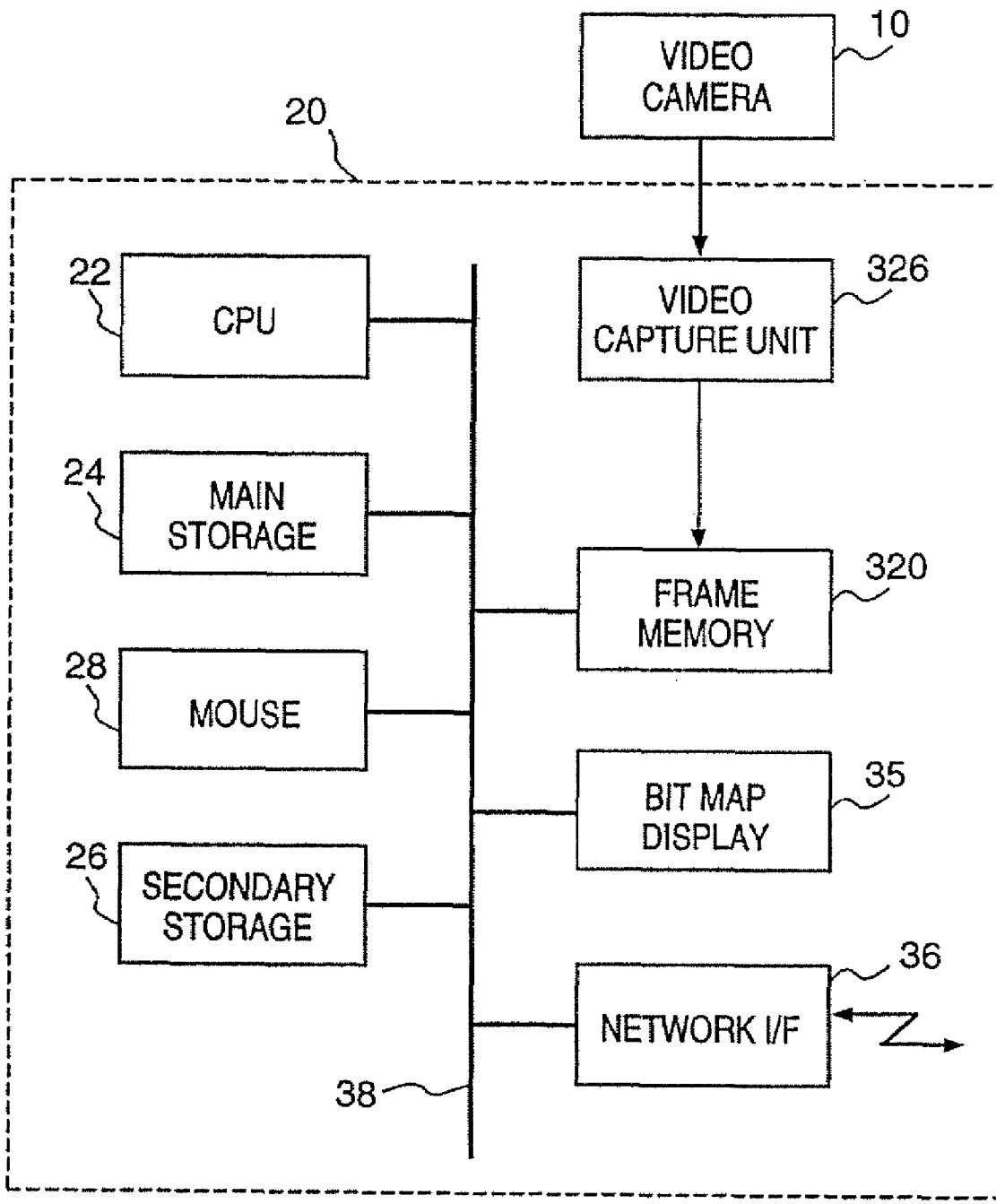
FIG. 30 is a block diagram showing an outline of the configuration of the fifth embodiment of the present invention.

FIG. 30 is a block diagram showing an outline of the configuration of the fifth embodiment of the present invention. Referring to FIG. 30, a CPU 22 for controlling the overall system, a main storage 24 of the CPU 22, a bit map display 35, a mouse 28, a network interface 36, and a frame memory 320 are connected to a bus 38.

A video capture unit 326 converts an output video signal from a video camera 10 into a digital signal and outputs the signal to the frame memory 320. An object lens of the video camera 10 is a high-resolution, wide-angle lens capable of picking-up an image of large area within the field of view of the lens. An image pick-up means of the video camera 10 is desirably a Highvision camera or a device with a higher resolution.

Figure 31:
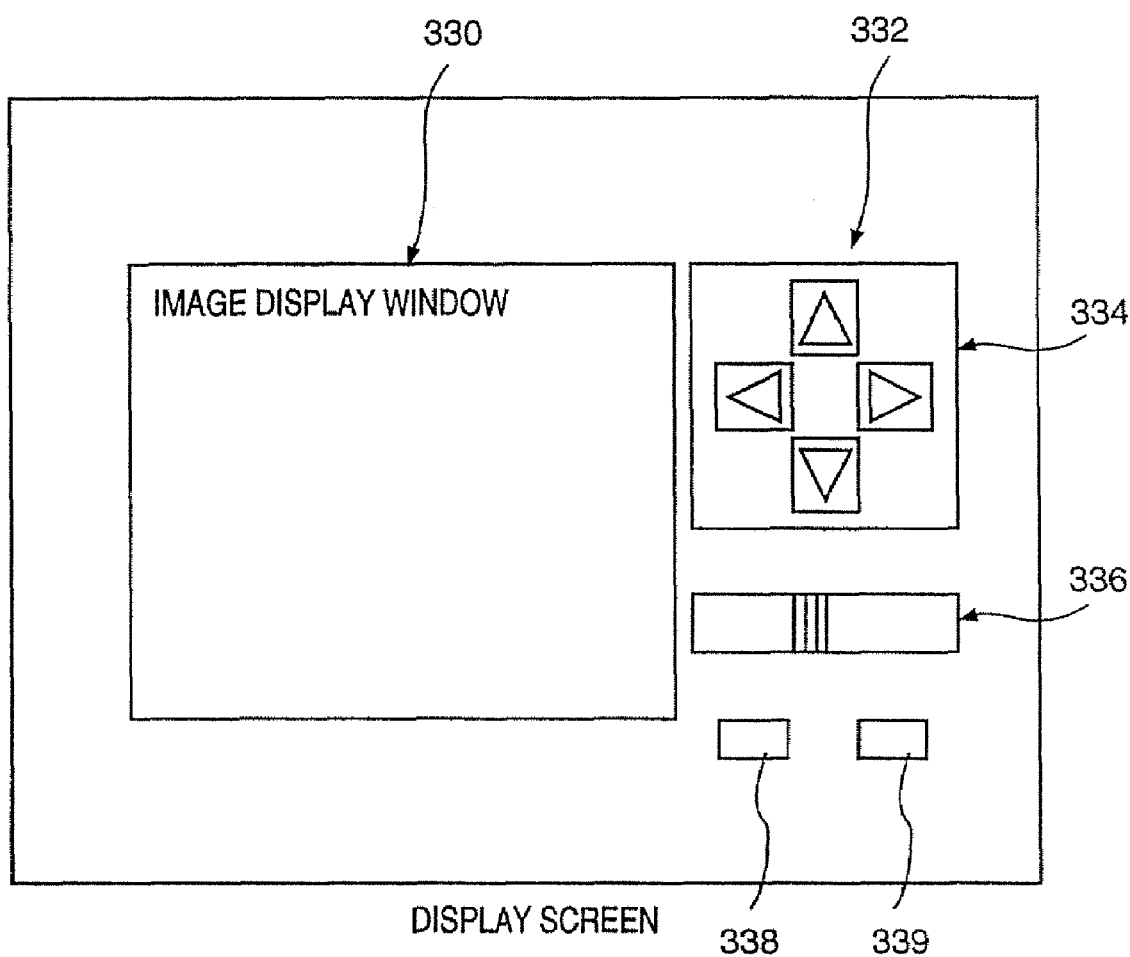
FIG. 31 is a view showing an example of the screen in the fifth embodiment.

FIG. 31 shows an example of the display screen of the display 35. A window system capable of displaying a plurality of overlapped windows is operating on the display 35. In FIG. 31, an image display window 330 and an operation panel 332 are displayed. The image display window 330 displays a portion of an image picked-up by the video camera 10. The operation panel 332 is used to designate which portion of the input image from the video camera 10 is to be displayed on the image display window 330, and to designate the magnification at which the selected image portion is displayed. The operation panel 332 includes a button 338 for designating an imaging inhibited area and a clear button 339. The operation panel 332 further includes a position designation panel 334 and a magnification designation panel 336. The position designation panel 334 is used to designate a portion of the input image from the video camera 10 which is to be displayed in the image display window 330. The magnification designation panel 336 is used to designate the magnification of the image displayed in the image display window 330.

In this embodiment, designation of the imaging inhibited area is done in the same manner as in the fourth embodiment. Therefore, a detailed description of a procedure of the designation will be omitted.

Figure 32:
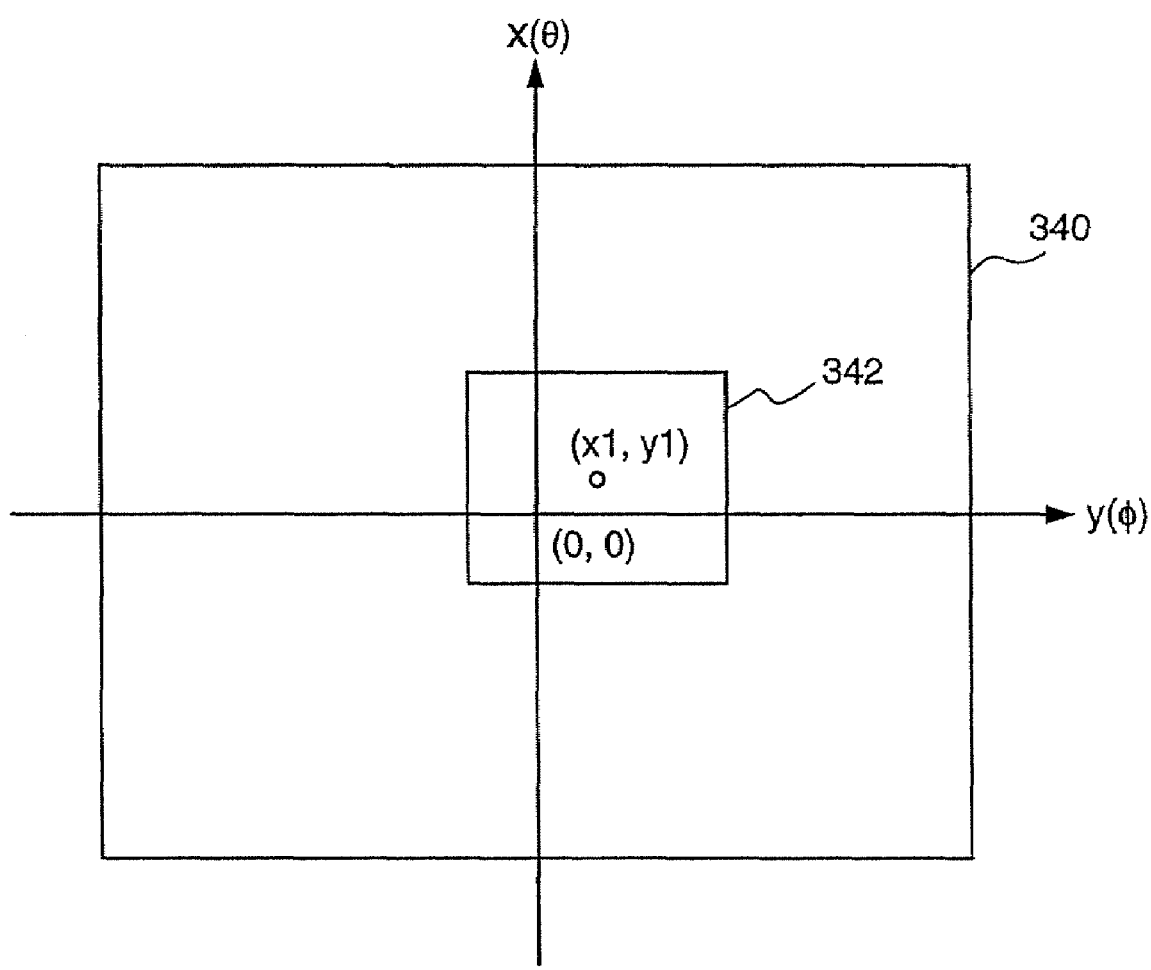
FIG. 32 is a view for explaining an input image and an extraction range.

FIG. 32 shows the relationship between an image (input image) picked-up by the video camera 10 and stored in the frame memory 320 and an image (display image) displayed in the image display window 330. Reference numeral 340 denotes an input image, i.e., an image which is picked-up by the video camera 10 and stored in the frame memory 320 by the video capture unit 326 and from which an imaging inhibited area is excluded. Reference numeral 342 denotes an area extracted from the input image 340 and displayed in the image display window 330. If the extraction area 342 is outside the input image 340, fixed-color data or the like is displayed in this outside portion. This allows a user to readily recognize on the screen that he or she is attempting to see a portion outside the sensing range or a portion outside the imaging inhibited area. Therefore, except in such a case or portion, the extraction area 342 generally coincides with the display image.

Assuming that the vertical and horizontal directions on the imaging screen of the camera 10 are $\underline{x}$ and $\underline{y}$ axes, respectively, the angles in the $\underline{x}$ and $\underline{y}$ directions are represented by $\theta$ and $\varnothing$, respectively, and $\theta=0$, $\varnothing=0$, $x=0$, and $y=0$ in the center of the input image, the central coordinates (xl,yl) of the display image are represented by xl=L tan θ yl=L tan ⌀ where L is a constant. The display area to be extracted from the input image is determined by this origin coordinate point (xl,yl) and the display magnification. The higher the display magnification the smaller the vertical and horizontal dimensions of the extraction area.

The pixel density of the image extracted from the extraction area 342 is so converted as to meet the number of pixels in the image display window 330. Assuming, for example, that the numbers of pixels in the image display window 330 are H (vertical)×W (horizontal) and the numbers of pixels in the area extracted from the input image are h (vertical)×w (horizontal), H and W rarely equal h and w, respectively. Generally, the pixel data in the extraction range is interpolated and thinned so as to meet the number of pixels in the image display area of the image display window 330. Various known methods are usable as this pixel density conversion method.

The center (xl,yl) of the extraction area 342 can be freely designated by operating four-direction keys on the position designation panel 334 by using the mouse. Also, an arbitrary display magnification can be designated on the magnification designation panel 336. The vertical (h) and horizontal (w) dimensions of the extraction range 342 are determined by the magnification designated on the magnification designation panel 336 and the vertical and horizontal dimensions of the image display window 330.

The image in the extraction area 342 is displayed on the display 35 or transmitted to a remote place via the network interface 36.

In this embodiment, tilt(θ), pan(ø), and zoom(z), the same commands as used in a camera operation command system, are used in a command system for changing the center of the extraction area 342. Tilt(θ) is a command for tilting in the vertical direction, pan(ø) is a command for panning in the horizontal direction, and zoom(z) is a command for zooming.

That is, the tilt command is assigned to the vertical keys on the position designation panel 334. While these keys are depressed, the CPU 22 increases or decreases the angle θ to generate a tilt(θ) command. The pan command is assigned to the horizontal keys on the position designation panel 334. While these keys are depressed, the CPU 22 increases or decreases the angle ø to generate a pan(ø) command. The zoom command is assigned to the scroll bar on the magnification designation panel 336. In accordance with the movement of this scroll bar, the CPU 22 generates a zoom(z) command of a magnification z meeting the movement.

The tilt and pan commands change the center of the area 342 extracted from the frame memory 320, and the zoom command changes the size of the extraction area 342. These commands can be transmitted to a remote plate via the network 36. That is, it is possible to remotely change the area extracted from a frame memory in an apparatus with the same configuration as in FIG. 30 installed in a distant place.

Figure 33:
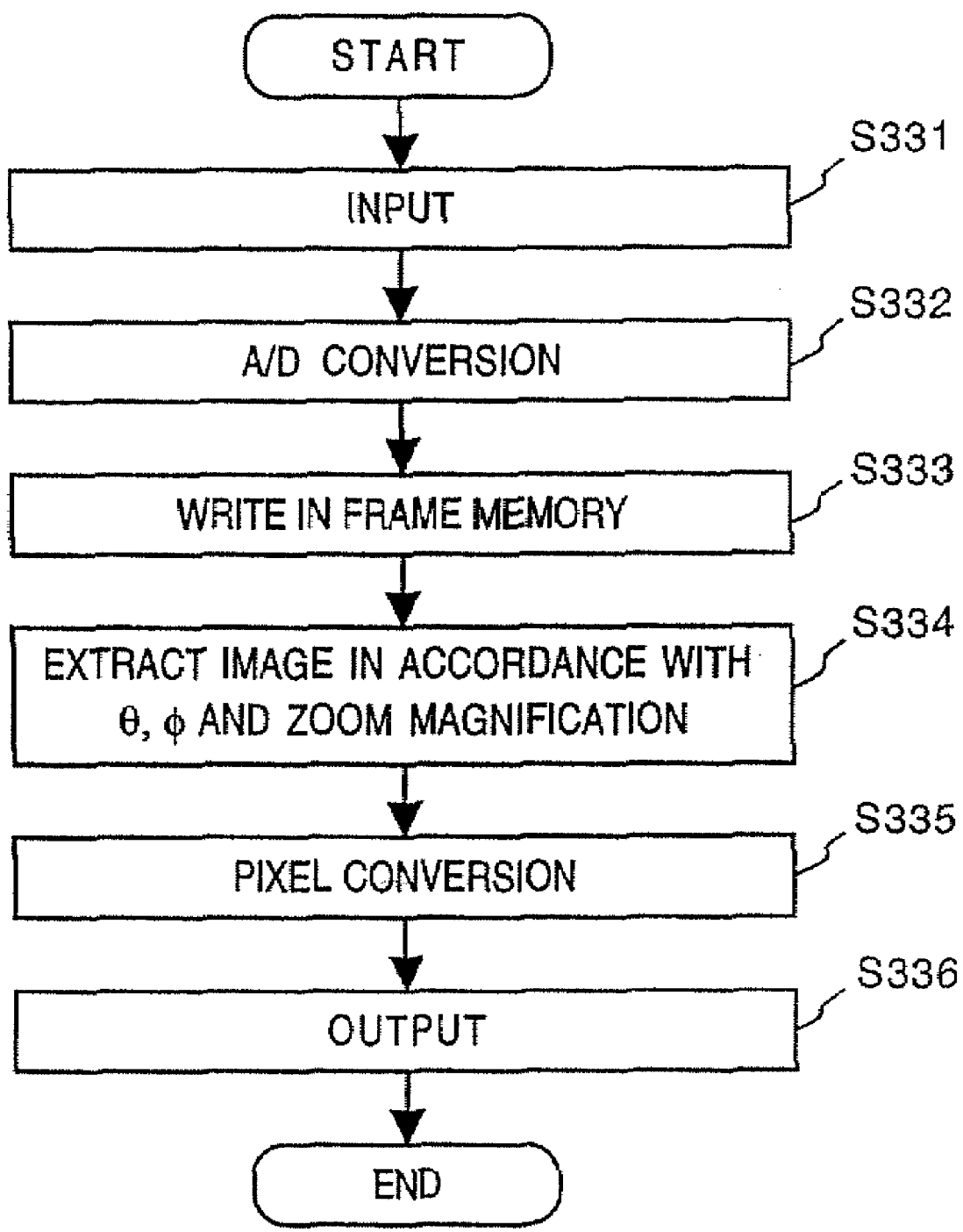
FIG. 33 is a flow chart of the fifth embodiment.

FIG. 33 shows the flow of a procedure from imaging to image display in this embodiment. A dynamic image can be reproduced and displayed if this procedure is executed within one frame cycle of a dynamic image.

Referring to FIG. 33, steps S334 and S335 correspond to a control procedure done by a video communication controller 20. When an image is input from the camera 10 (step S331), the video capture unit 326 writes the image data into the frame memory 320 (steps S332 and S333). In accordance with the tilt angle, pan angle, and zoom magnification designated on the panels 334 and 335, the extraction area 342 is determined and the image is extracted as shown in FIG. 32 (step S334). The extracted image is converted to meet the size of the window 330 in which the image is to be displayed (step S335). The converted image is then output and displayed (step S336).

The above procedure is executed for a local camera or by a client in a remote place. To operate a camera in a distant place, the tilt, pan, and zoom commands are generated and transmitted to a controller of the camera in that place.

If the pan, tilt, and zoom operations are performed for the same camera, it is only necessary to execute steps S334 and S335.

As described above, the display direction and width can be changed by electronically changing the area 342 extracted from the frame memory 320. Accordingly, it is possible to obtain essentially the same effect as when the direction and the zoom magnification of a single camera are instantaneously changed.

Remote control is made possible by transmitting an image extracted from the extraction area 342 of the frame memory 320 to a terminal in a distant place via the network and transmitting the individual commands described above from the terminal in the distant place. The remote control is basically the same as when panning, tilting, and zooming of a camera are remotely operated.

In this embodiment, an image extracted from the extraction area 342 of the frame memory 320 is displayed in the image display window 330 of the bit map display 35 and output to the network where necessary. However, it is obvious that the image can also be written into a file. That is, any output form is usable as long as the processing speed is sufficiently high. The image also can be compressed by the JPEG or MPEG coding scheme before being transferred.

It is also evident that if the video camera 10 includes a memory means which can be externally controlled, this memory means can be used instead of the frame memory 320.

Figure 34:
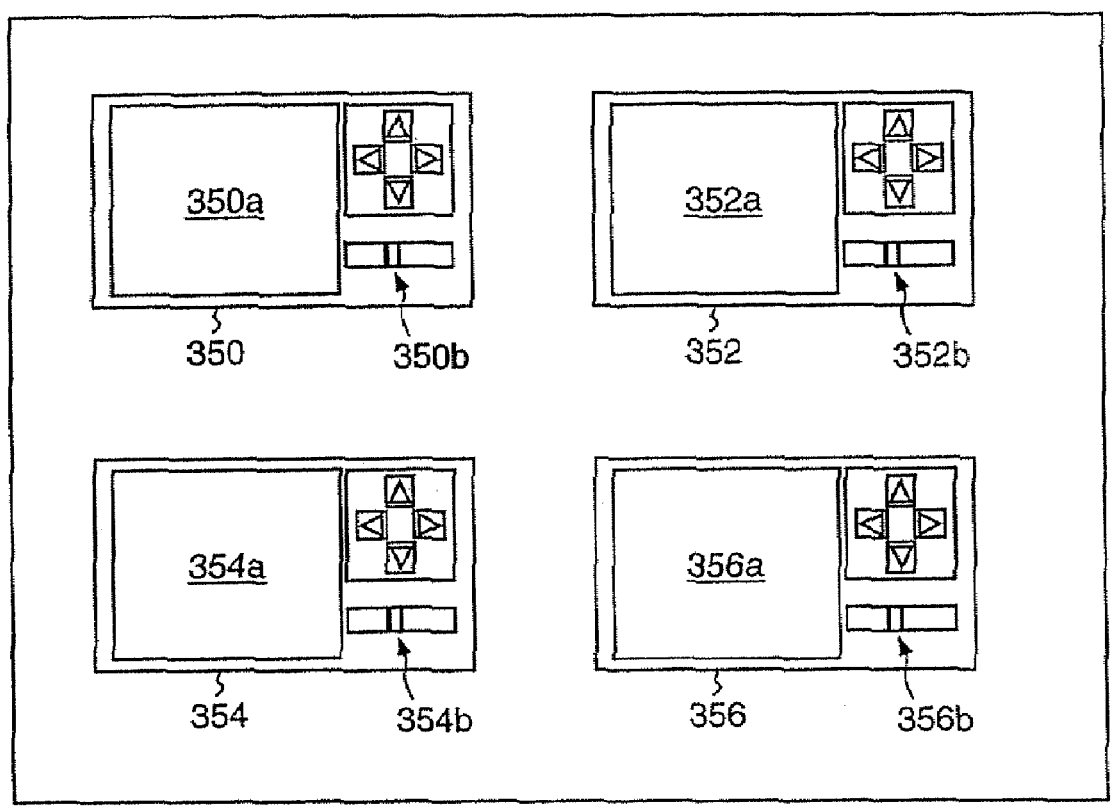
FIG. 34 is a view showing an example of the screen when four extraction ranges are set.
Figure 35:
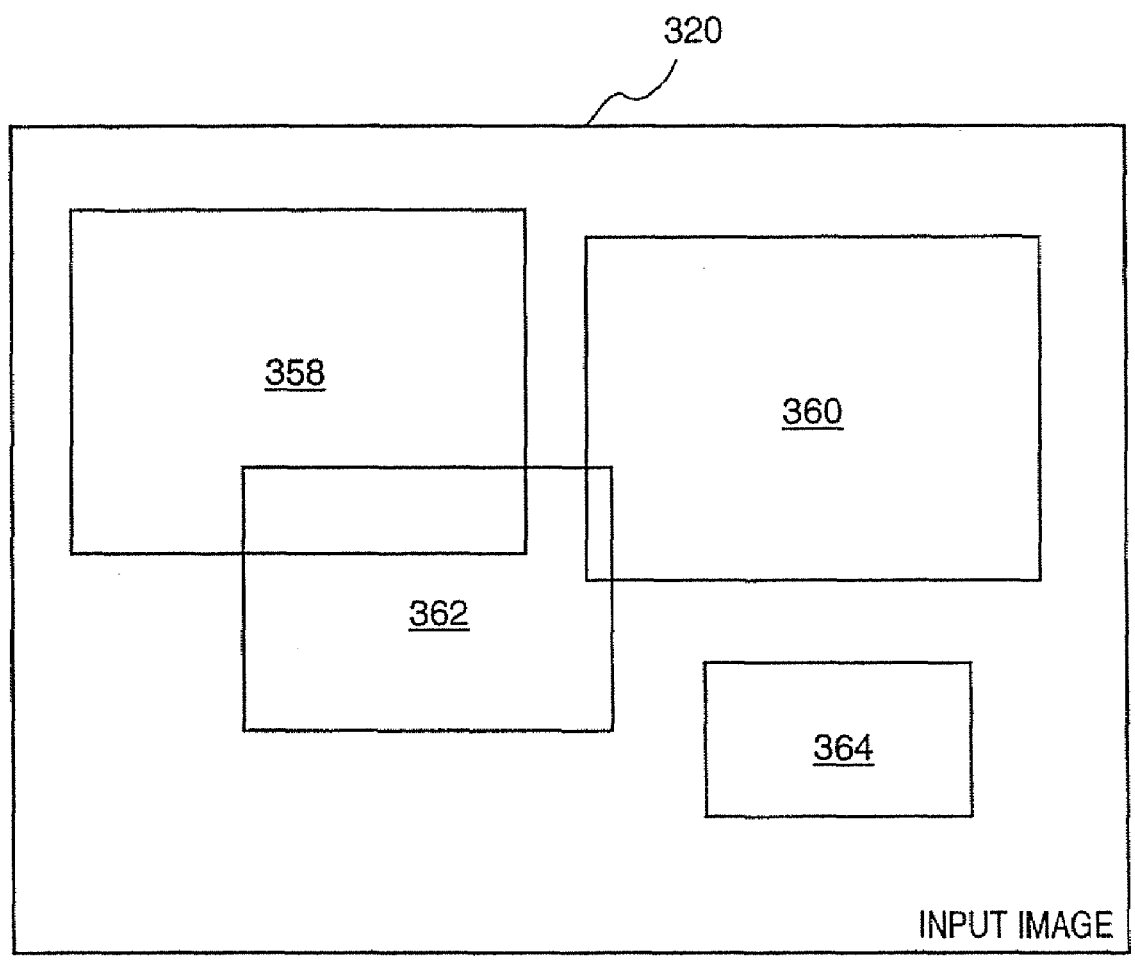
FIG. 35 is a view for explaining four extraction ranges set in an input image.

Although one extraction area 342 is set for an input image in the above embodiment, a plurality of extraction ranges also can be set. If this is the case, each extraction range is provided with a camera window having an image display window for displaying an image extracted from the extraction range and an operation panel for setting the extraction area. FIG. 34 shows an example of a screen having four camera windows 350, 352, 354, and 356. FIG. 35 shows an example of setting of corresponding extraction areas 358, 360, 362, and 364 in the frame memory 320. Images extracted from the extraction areas 358, 360, 362, and 364 are displayed in image display windows 350a, 352a, 354a, and 356a in the camera windows 350, 352, 354, and 356, respectively. Operation panels 350b, 352b, 354b, and 356b in the camera windows 350, 352, 354, and 356 are used to operate the positions and sizes of the extraction ranges 358, 360, 362, and 364, respectively.

The correspondence between the camera windows 350, 352, 354, and 356 and the extraction areas 358, 360, 362, and 364 is managed by a table as illustrated in FIG. 36. Virtual camera numbers directly correspond to the extraction areas 358, 360, 362, and 364. In accordance with an operation on the operation panels 350b, 352b, 354b, and 356b, the corresponding values of θ, ø, and zoom magnification in the row of the corresponding operation panel ID are updated, and the corresponding extraction area is reset in accordance with these new values.

Figure 37:
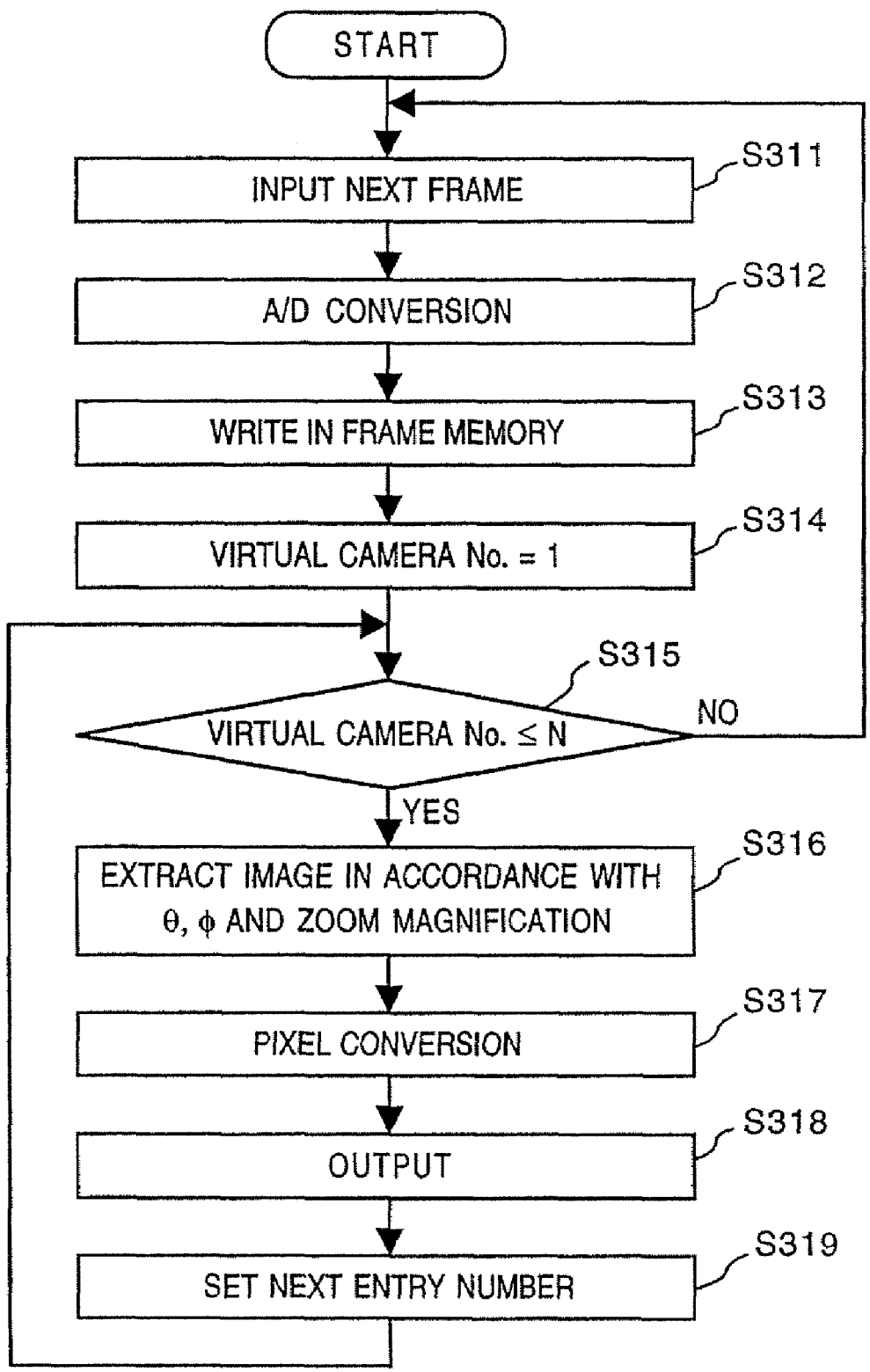
FIG. 37 is a flow chart for explaining an operation when N virtual cameras are included in a system.

FIG. 37 is a flow chart of an operation of capable of setting a plurality of extraction areas. This flow chart is formed by extending the flow chart shown in FIG. 33 so as to correspond to each entry in the table in FIG. 36. The flow chart in FIG. 37 differs from the flow chart in FIG. 33 only in that loop processing is added. Assuming the frame rate of a dynamic image is F (frame/sec), N images can be extracted from an input image from a single camera so long as a procedure from step S311 to step S319 is executed within 1/F second. To transfer the images to the network, virtual camera numbers are added to the image data to be transmitted in order to be able to identify which image is extracted from which extraction area. A plurality of images with different virtual camera numbers can be displayed as if images from a plurality of cameras are displayed.

In this way it is possible by physically using a single camera to obtain images in various directions at various zoom magnifications, as if a plurality of cameras were used. It is of course possible to independently and instantaneously change the directions and zoom magnifications of the individual images.

Figure 38:
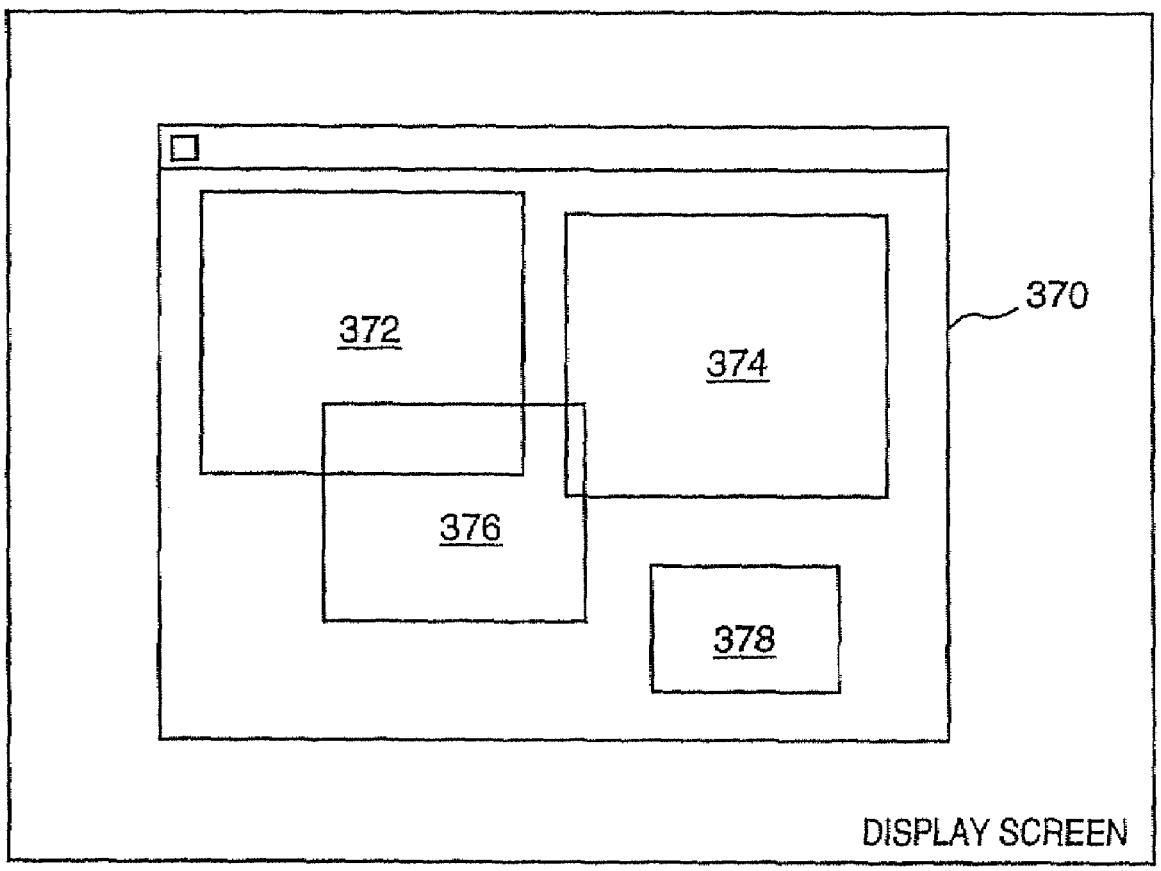
FIG. 38 is a view showing an example of a user interface for operating and displaying the extraction ranges.

By the use of a graphical user interface shown in FIG. 38, one or more extraction areas can be set more visually. Reference numeral 370 denotes an operation window for setting extraction areas. The size of this operation window is proportional to the size of an image obtained by excluding an imaging inhibited area from an input image to the frame memory 320. In the window 370, rectangular frames 372, 374, 376, and 378 indicating extraction areas with desired positions and sizes are set. These rectangular frames 372 to 378 are expandable and movable within the area of the window 370. The position and size of each rectangular frame in the window 370 represent the position and size of the corresponding extraction area. When the rectangular frames 372 to 378 are initially set, the points at opposing corners of each rectangular frame are designated by using, e.g., a mouse. As shown in FIG. 38, a portion of an input image to which each extraction area corresponds to can be clearly seen.

As can be readily understood from the above description, in this embodiment the same effect as one obtainable when a plurality of cameras are used can be obtained by physically using a single camera. That is, it is possible to instantaneously change the direction and the zoom magnification of the virtual camera and to simultaneously obtain images in various directions at various zoom magnifications.

This embodiment can be combined with any of the second to fourth embodiments.

In a case where the second embodiment is applied, if a designated extraction frame overlaps an imaging inhibited area, this designation is neglected and an error message is displayed.

In a case where the third or fourth embodiment is applied, if a designated extraction frame overlaps an imaging inhibited area, the entire extraction frame is moved by an amount corresponding to the overlapped portion. More specifically, the extraction frame is moved toward the inside of an input image by amounts corresponding to the overlapped lengths in both the X- and Y-axis directions.

The systems of the first to fifth embodiments described above can also be realized by connecting a camera to a general-purpose apparatus such as a personal computer and supplying programs for performing the control in these embodiments from a storage medium.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile tape memory, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU, or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

What is claimed is:

1. An image processing apparatus connected via a network with a plurality of external apparatuses each of which has an operation panel and an image displaying window, comprising:
   a storage unit; and
   an output unit for outputting a plurality of images which are extracted from an image stored by said storage unit in accordance with areas set by the operation panels to the image displaying windows corresponding to the operation panels to display the plurality of images.

2. The image processing apparatus according to claim 1, wherein the operation panel sets a center position and a size of the area.

3. The image processing apparatus according to claim 1, wherein said output unit adds an identifier to each of the plurality of images to be output.

4. The image processing apparatus according to claim 1, wherein said storage unit stores an image captured by a camera.

5. The image processing apparatus according to claim 1, wherein at least one of the plurality of external apparatuses has a plurality of the image displaying windows and said output unit outputs the plurality of extracted images to said at least one of the plurality of external apparatuses.

6. An image output method for outputting images via a network to a plurality of external apparatuses each of which has an operation panel and an image displaying window, said method comprising:
   a storing step of storing an image to a storage; and
   an outputting step of outputting a plurality of images which are extracted from an image stored in said storage in accordance with areas set by the operation panels to the image displaying windows corresponding to the operation panels to display the plurality of images.

7. The image output method according to claim 6, wherein the operation panel sets a center position and a size of the area.

8. The image output method according to claim 6, wherein said outputting step adds an identifier to each of the plurality of images to be output.

9. The image output method according to claim 6, wherein said storing step stores an image captured by a camera.

10. The image output method according to claim 6, wherein at least one of the plurality of external apparatuses has a plurality of the image displaying windows and said output step outputs the plurality of images to said at least one of the plurality of external apparatuses.

* * * * *